(12) United States Patent
Mitsuhashi

(10) Patent No.: US 8,670,187 B2
(45) Date of Patent: Mar. 11, 2014

(54) ZOOM LENS

(75) Inventor: Takahiro Mitsuhashi, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 9 days.

(21) Appl. No.: 13/586,204

(22) Filed: Aug. 15, 2012

(65) Prior Publication Data

US 2013/0100539 A1  Apr. 25, 2013

(30) Foreign Application Priority Data

Oct. 21, 2011 (JP) ................................. 2011-232252

(51) Int. Cl.
*G02B 15/14* (2006.01)

(52) U.S. Cl.
USPC .......................................... 359/690; 359/689

(58) Field of Classification Search
CPC .............................. G02B 15/14; G02B 15/173
USPC .......................................... 359/683, 689, 690
See application file for complete search history.

(56) References Cited

U.S. PATENT DOCUMENTS

| | | | |
|---|---|---|---|
| 6,778,329 B2 * | 8/2004 | Ozaki | 359/684 |
| 7,180,684 B1 * | 2/2007 | Ori | 359/690 |
| 7,639,431 B2 * | 12/2009 | Hosoya et al. | 359/690 |
| 8,134,783 B2 | 3/2012 | Saito et al. | |

FOREIGN PATENT DOCUMENTS

| | | |
|---|---|---|
| JP | 6-138390 A | 5/1994 |
| JP | 2899019 B2 | 3/1999 |
| JP | 2005-227507 A | 8/2005 |
| JP | 2010-237455 A | 10/2010 |

* cited by examiner

*Primary Examiner* — David N Spector
(74) *Attorney, Agent, or Firm* — Foley & Lardner LLP

(57) ABSTRACT

A zoom lens includes sequentially from an object side, a first lens group having a positive refractive power, a second lens group having a negative refractive power, an aperture stop, and a third lens group having a positive refractive power. The first lens group includes a negative lens and a positive lens. The second lens group includes sequentially from the object side, a negative lens, a negative lens, and a positive lens. The third lens group includes sequentially from the object side a front group having a positive refractive power, a middle group having a negative refractive power, and a rear group having a positive refractive power. The front group is formed by a positive aspheric lens. The middle group is includes a cemented lens formed by a positive lens and a negative lens.

5 Claims, 16 Drawing Sheets

FIG.2
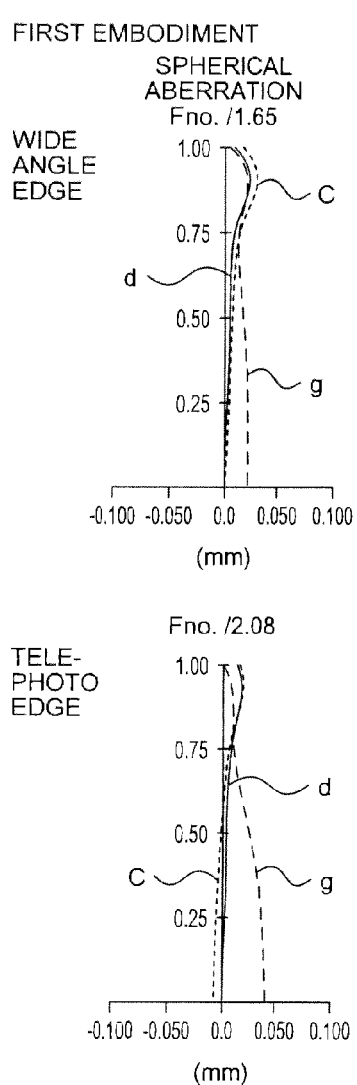
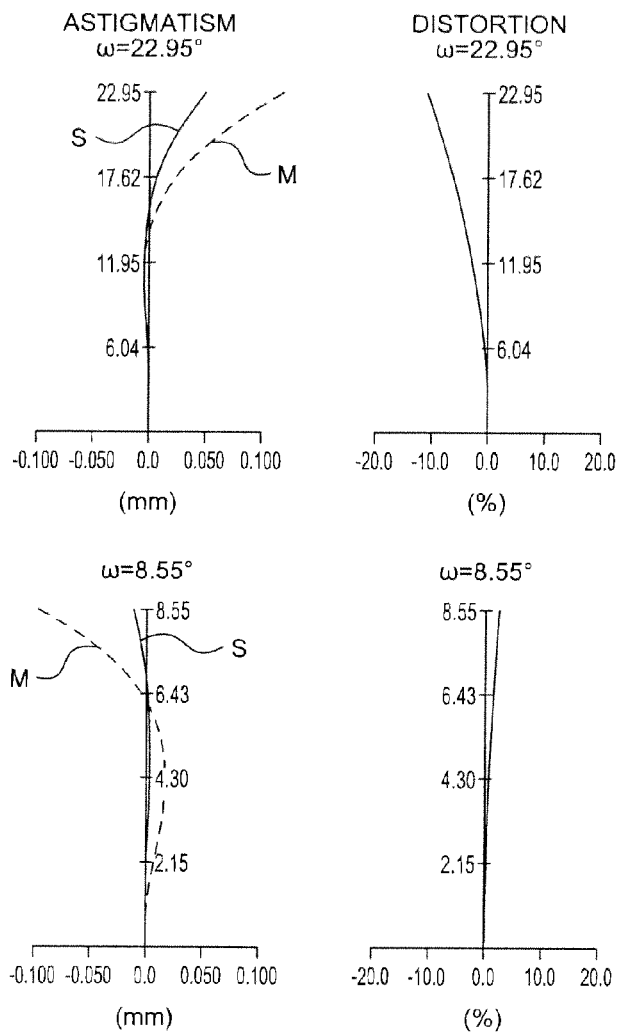

FIG.4
SECOND EMBODIMENT
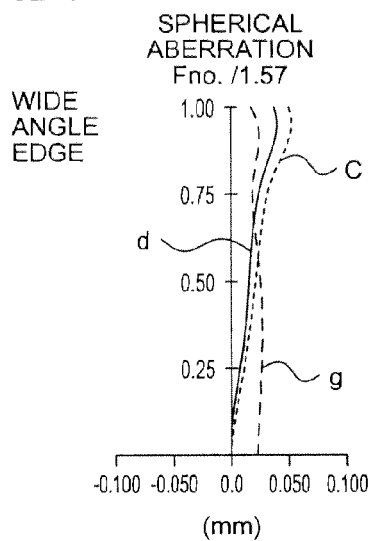
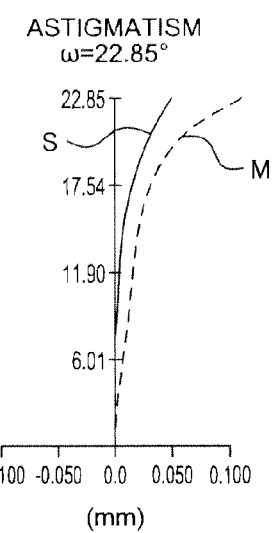
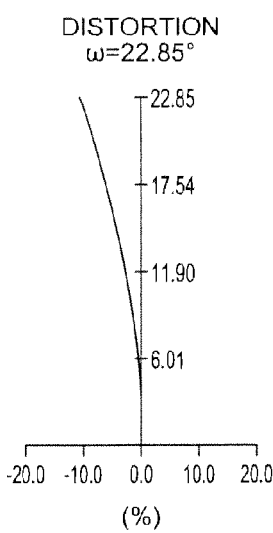
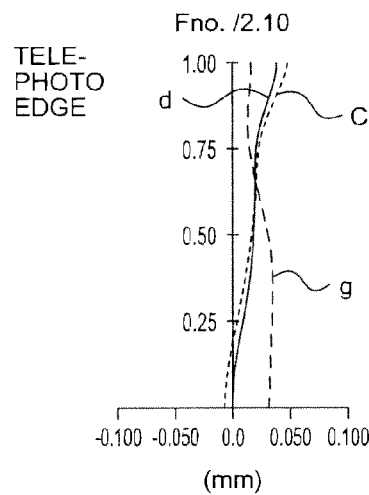
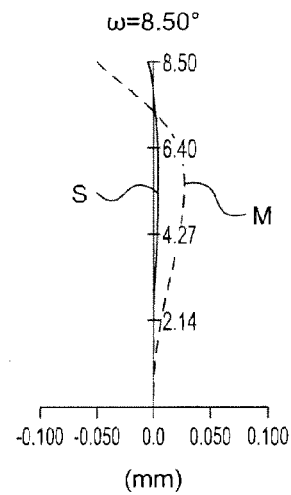
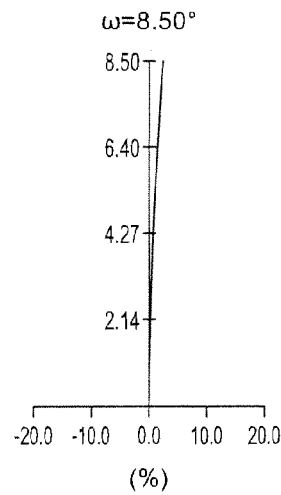

FIG.6
THIRD EMBODIMENT
WIDE ANGLE EDGE
SPHERICAL ABERRATION Fno. /1.62
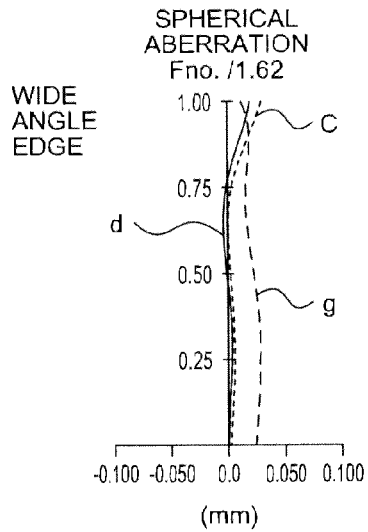
ASTIGMATISM ω=22.05°
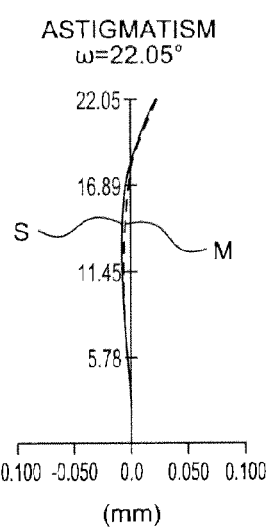
DISTORTION ω=22.05°
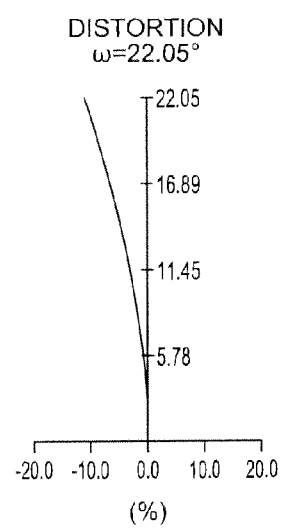
TELE-PHOTO EDGE
Fno. /2.01
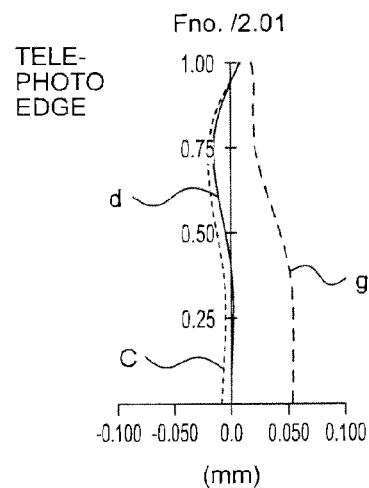
ω=8.25°
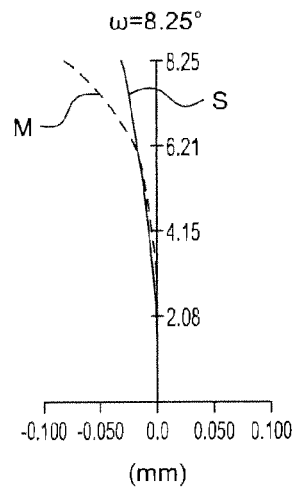
ω=8.25°
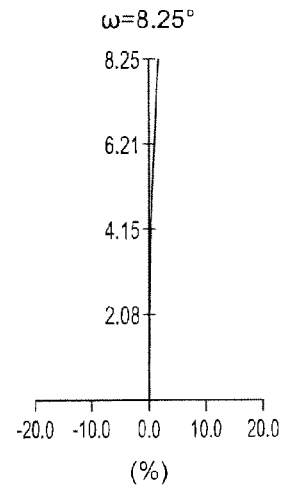

FIG.8
FOURTH EMBODIMENT
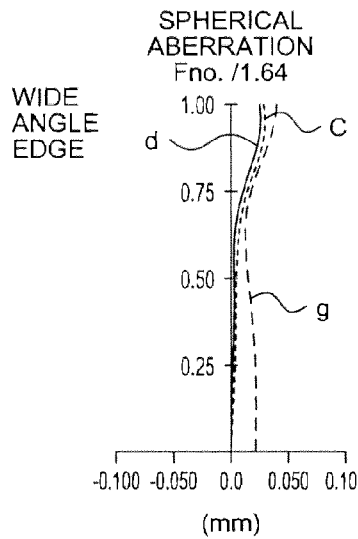
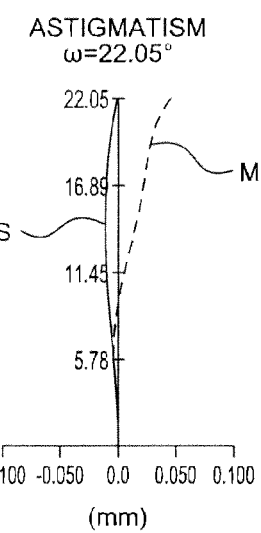
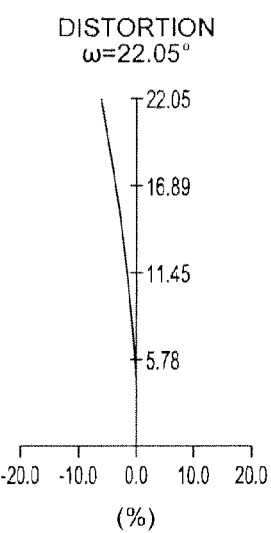
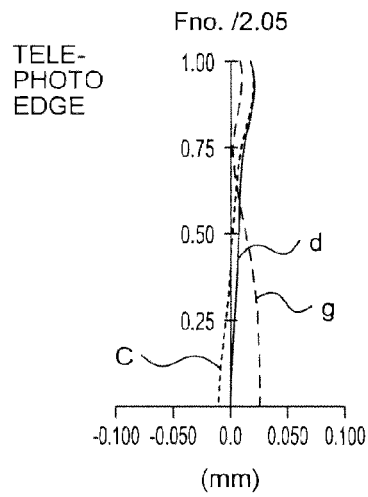
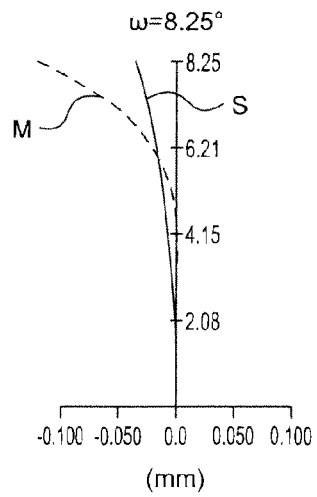
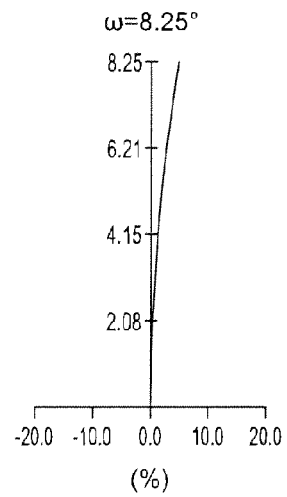

FIG.10
FIFTH EMBODIMENT
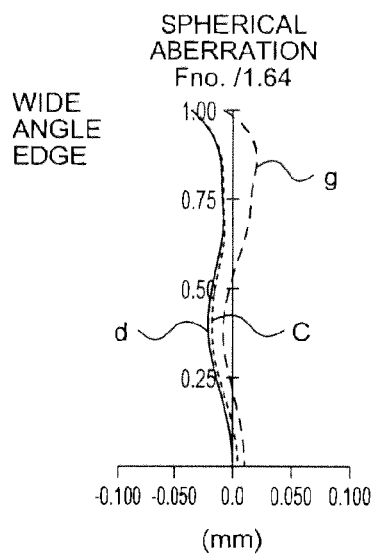
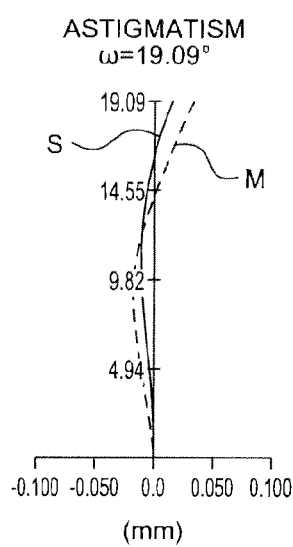
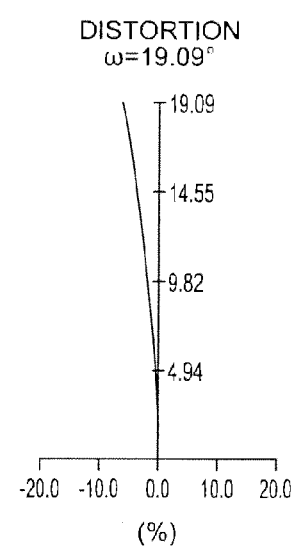
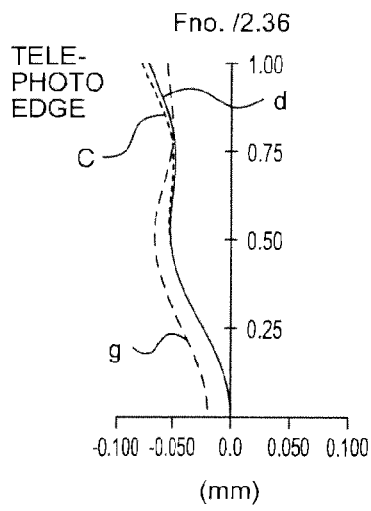
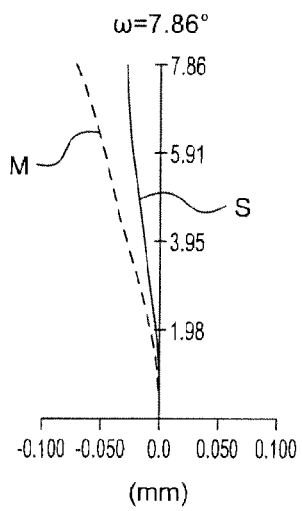
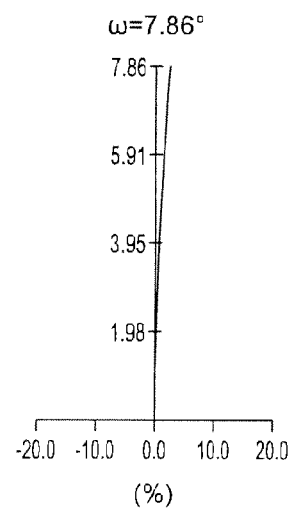

FIG.12
SIXTH EMBODIMENT
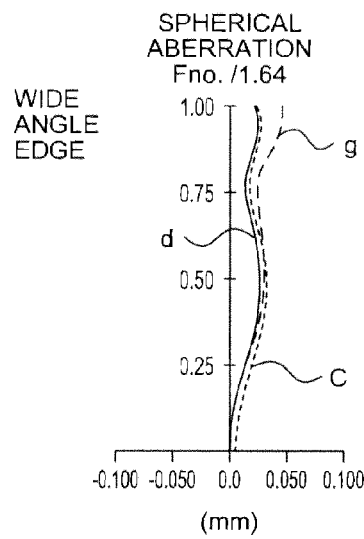
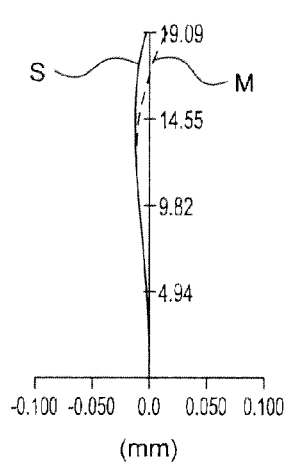
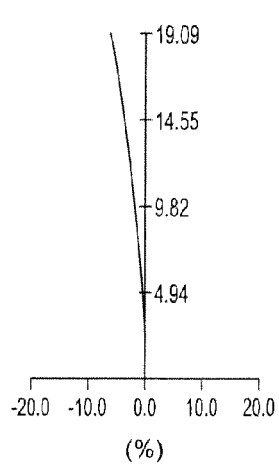
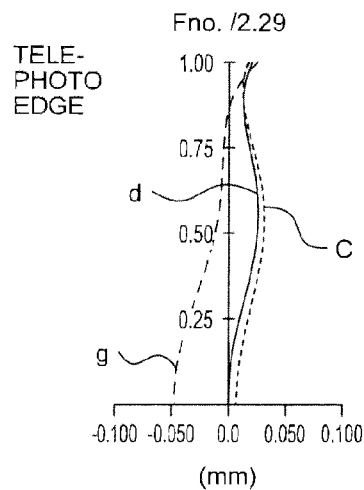
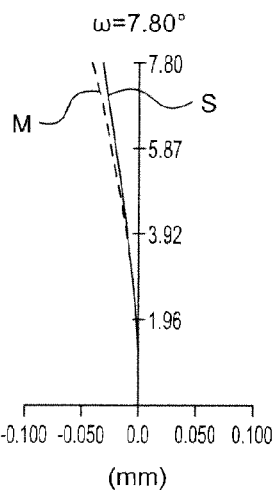
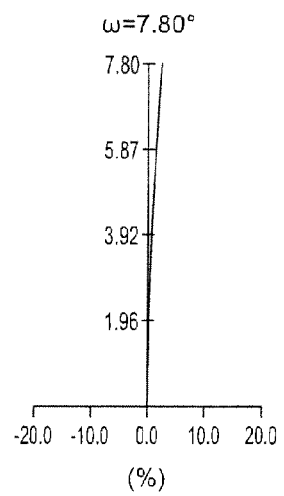

FIG.14
SEVENTH EMBODIMENT
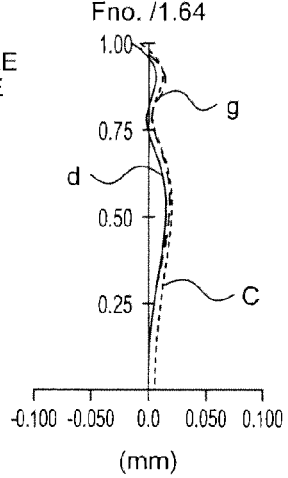
WIDE ANGLE EDGE
SPHERICAL ABERRATION
Fno. /1.64
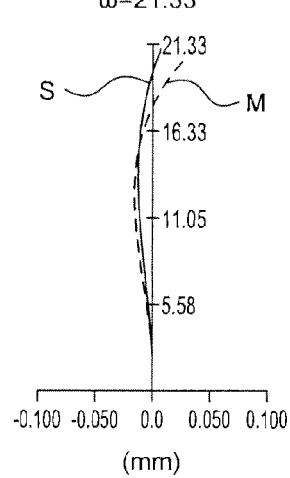
ASTIGMATISM
ω=21.33°
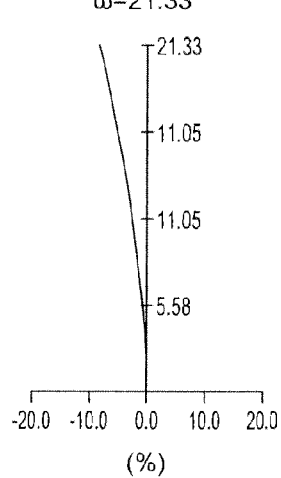
DISTORTION
ω=21.33°
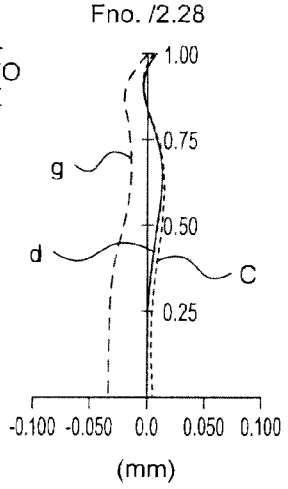
TELE-PHOTO EDGE
Fno. /2.28
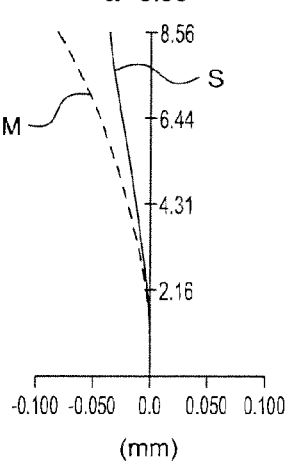
ω=8.56°
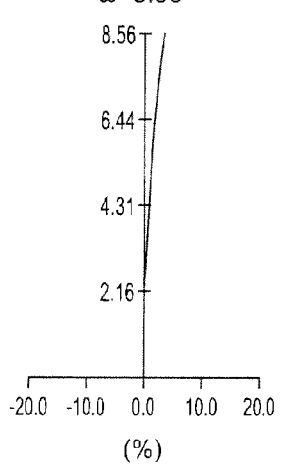
ω=8.56°

FIG.16
EIGHTH EMBODIMENT
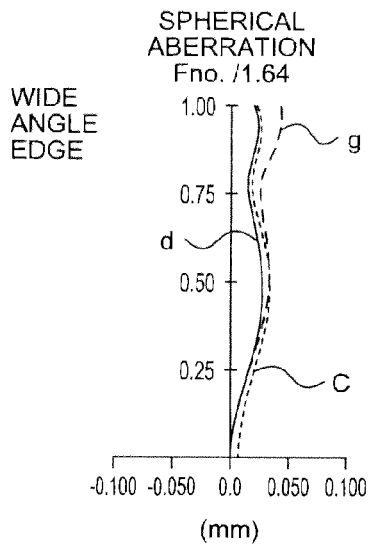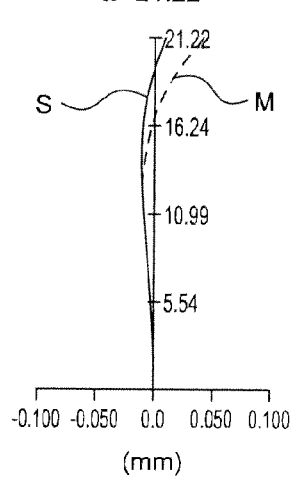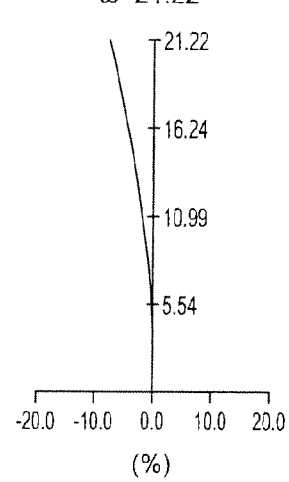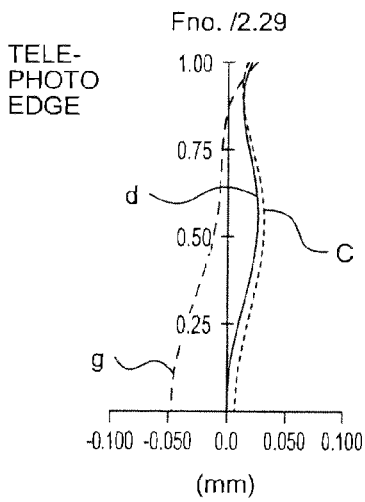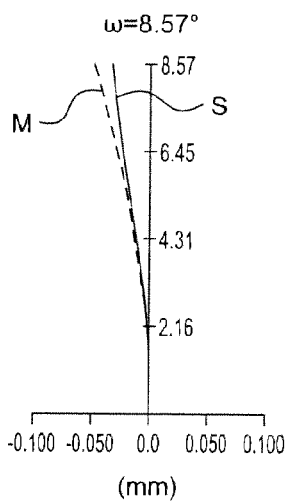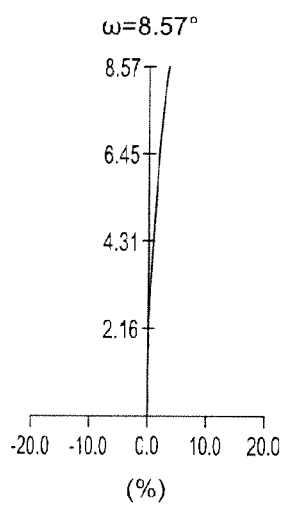

ZOOM LENS

BACKGROUND OF THE INVENTION

1. Field of the Invention

The present invention relates to a zoom lens suitable for imaging apparatuses equipped with a solid state image sensor such as a charged coupled device (CCD) and a complementary metal oxide semiconductor (CMOS).

2. Description of the Related Art

The pixel counts of solid state image sensors equipped on imaging apparatuses such as digital cameras and video cameras continue to increase. Higher performance enabling even finer features of a subject to be seen is also demanded of optical systems used on imaging apparatuses equipped with such solid state imaging sensors and numerous optical systems developed to meet such demands have appeared (see, for example, Japanese Patent No. 2899019, and Japanese Patent Application Laid-Open Publication Nos. H6-138390, 2010-237455, and 2005-227507).

High resolution imaging is also demanded of surveillance cameras to record images as evidence having high credibility for the purposes of crime prevention. Optical systems having a long focal length and achieving a bright image of the subject are also demanded to perform high resolution imaging.

Typically, surveillance cameras capture images using visible light during the day and near infrared light at night. Therefore, the optical system used in a surveillance camera has to accommodate a wide spectrum of wavelengths, ranging from visible light to near infrared. In general, in an optical system designed to use visible light, chromatic aberration especially occurs in the near infrared range and when imaging is performed at night in the near infrared range, the obtained images are out of focus. Thus, in particular, favorable correction of chromatic aberration occurring in the visible light range to the near infrared range is strongly demanded of optical systems used in surveillance cameras.

Furthermore, surveillance cameras used for crime prevention are preferably as small as possible so as to be inconspicuous. In addition, a compact size enabling housing within a small structure is demanded of the optical system used in surveillance cameras.

Although the optical system recited in Japanese Patent No. 2899019 has a zoom ratio on the order of 3 and offers favorable correction of aberration variations during zooming, the optical system is a dark lens having an F number on the order of 2.0 to 2.8. In addition, aberration of near infrared light is not corrected. Therefore, the optical system is not suitable as an optical system to be used for a surveillance camera.

Although the optical system recited in Japanese Patent Application Laid-Open Publication No. H6-138390 is compact having an overall length that is short, the optical system has a large F number, despite being a wide angle lens, and does not sufficiently correct chromatic aberration. Therefore, the optical system has a problem in terms of imaging performance with respect to near infrared light. In addition, the distance from the aperture stop to the image plane is long, making the focal length long and in turn, making accommodation in a small surveillance camera difficult.

Although the optical system recited in Japanese Patent Application Laid-Open Publication No. 2010-237455 is a zoom lens having a high zoom ratio and a relatively short overall length, making the optical system favorable for a small surveillance camera, the F number is large and chromatic aberration correction is insufficient. Thus, the optical system has a problem in terms of imaging performance with respect to near infrared light.

The optical system recited in Japanese Patent Application Laid-Open Publication No. 2005-227507 is a zoom lens having a high zoom ratio of 10 times, an F number on the order of 1.4 to 2.0, and favorable aberration correction of near infrared light. Nonetheless, the optical system has low imaging performance with respect to visible light and a long overall length, and therefore, is not suitable as an optical system for a small surveillance camera.

SUMMARY OF THE INVENTION

It is an object of the present invention to at least solve the above problems in the conventional technologies.

A zoom lens according to one aspect of the present invention includes sequentially from an object side, a first lens group having a positive refractive power, a second lens group having a negative refractive power, an aperture stop, and a third lens group having a positive refractive power, the third lens group being moved along an optical axis from an image side toward the object side to zoom from a wide angle edge to a telephoto edge and the second lens group being moved along the optical axis from the object side toward the image side to zoom and correct variation of an image plane position. The first lens group includes a negative lens and a positive lens. The second lens group includes sequentially from the object side, two negative lenses and one positive lens. The third lens group includes sequentially from the object side, a front group that has a positive overall refractive power and includes a positive aspheric lens, a middle group that has a negative overall refractive power and includes one cemented lens formed by a positive lens and a negative lens, and a rear group having a positive refractive power. The zoom lens satisfies a conditional expression (1) $0.7 \leq fw/f3 \leq 1.0$ and a conditional expression (2) $-1.05 \leq f3/f2 \leq -0.5$, where fw represents a focal length of the entire optical system, at the wide angle edge; f2 represents a focal length of the second lens group; and f3 represents a focal length of the third lens group.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 2 is a diagram of various types of aberration occurring in the zoom lens according to the first embodiment;

FIG. 4 is a diagram of various types of aberration occurring in the zoom lens according to the second embodiment;

FIG. 6 is a diagram of various types of aberration occurring in the zoom lens according to the third embodiment;

FIG. 8 is a diagram of various types of aberration occurring in the zoom lens according to the fourth embodiment;

FIG. 10 is a diagram of various types of aberration occurring in the zoom lens according to the fifth embodiment;

FIG. 12 is a diagram of various types of aberration occurring in the zoom lens according to the sixth embodiment;

FIG. 14 is a diagram of various types of aberration occurring in the zoom lens according to the seventh embodiment;

FIG. 16 is a diagram of various types of aberration occurring in the zoom lens according to the eighth embodiment.

DETAILED DESCRIPTION OF THE PREFERRED EMBODIMENTS

Figure 1:
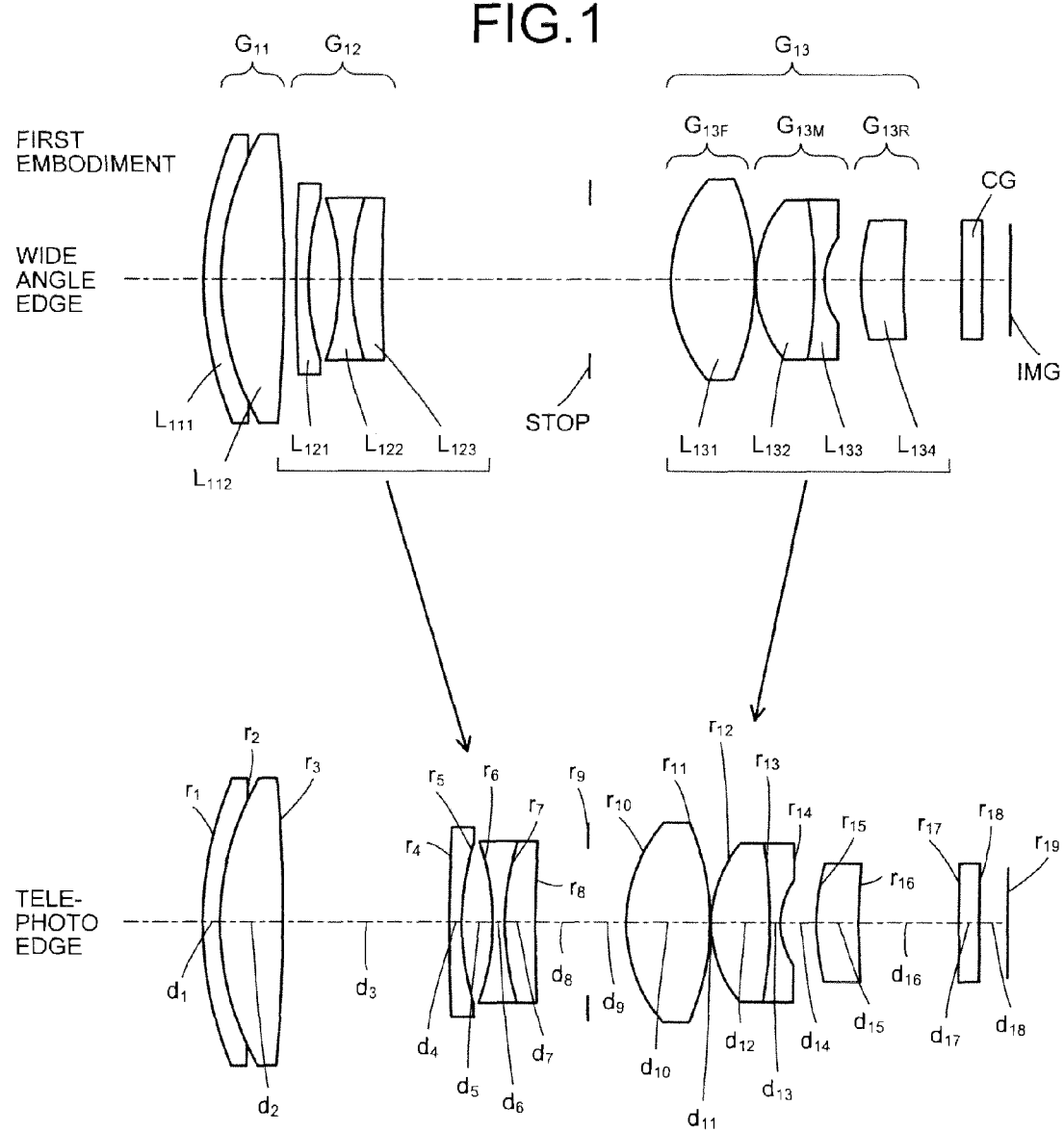
FIG. 1 is a cross sectional view (along the optical axis) of a zoom lens according to a first embodiment.

Referring to the accompanying drawings, exemplary embodiments according to the present invention are explained in detail below.

With reference to the accompanying drawings, preferred embodiments of a zoom lens according to the present invention are explained in detail below.

The zoom lens according to the present invention includes sequentially from an object side, a first lens group having a positive refractive power, a second lens group having a negative refractive power, an aperture stop, and a third lens group having a positive refractive power. The third lens group is moved along the optical axis from the image side toward the object side to zoom from the wide angle edge to the telephoto edge. The second lens group is moved along the optical axis from the object side toward the image side to perform zooming and to correct variation of the image plane position.

An object of the present invention is to provide a compact, bright zoom lens having favorable imaging performance with respect to light of a wide spectrum of wavelengths, ranging from visible light to near infrared light. To achieve this object, various conditions are set as indicated below.

In the zoom lens according to the invention, in addition to the configuration above, the first lens group includes a negative lens and a positive lens. This configuration enables, in particular, favorable correction of longitudinal chromatic aberration occurring at the telephoto edge of the optical system.

The second lens group includes sequentially from the object side, 2 negative lenses and 1 positive lens. By including the 2 negative lenses in the second lens group, the distance that the third lens group is moved during zooming is suppressed, enabling further reduction of the size of the optical system. Further, by including the 1 positive lens in the second lens group, chromatic difference of magnification and longitudinal chromatic aberration are corrected favorably.

The third lens group includes sequentially from the object side, a front group that has a positive overall refractive power and includes a positive aspheric lens; an middle group that has a negative overall refractive power and includes 1 cemented lens formed by a positive lens and a negative lens; and a rear group having a positive refractive power. In the third lens group, by including the positive aspheric lens in the front group, spherical aberration can be corrected favorably. By including the cemented lens formed by a positive lens and a negative lens in the middle group, favorable correction of longitudinal chromatic aberration occurring at the wide angle edge of the optical system and chromatic difference of magnification occurring at the telephoto edge is effected. Correction of spherical aberration is also effected. By giving the rear group a positive refractive power, field curvature can be corrected favorably. Although the rear group may be configured by multiple lenses, it suffices that the rear group have a positive refractive power overall, and with consideration of size and cost reductions of the optical system, the rear group is preferably configured by 1 positive lens.

The zoom lens according to the invention and having the configuration above, preferably satisfies the following conditions, where fw is the focal length of the entire optical system, at the wide angle edge; f2 is the focal length of the second lens group; and f3 is the focal length of the third lens group.

$$0.7 \leq fw/f3 \leq 1.0 \quad (1)$$

$$-1.0 \leq f3/f2 \leq -0.5 \quad (2)$$

Conditional expressions (1), (2) are conditions for reducing the size and improving the imaging performance of the optical system. Satisfaction of conditional expressions (1), (2) enables a bright lens to be realized that suppresses the occurrence of various types of aberration. Below the lower limit of conditional expression (1), the positive refractive power of the third lens group becomes too weak and the distance that the third lens group is moved during zooming increases, which is detrimental to reducing the size of the optical system. On the other hand, above the upper limit of conditional expression (1), correction of spherical aberration becomes excessive, inviting drops in imaging performance with respect to near infrared light and making visible light field curvature prominent and thus, is not desirable. Further, below the lower limit of conditional expression (2), the refractive power of the second lens group becomes too weak, making correction of coma occurring at the telephoto edge particularly difficult. On the other hand, above the upper limit of conditional expression (2), the refractive power of the third lens group becomes too weak and the distance that the third lens group is moved during zooming increases, which is detrimental to reducing the size of the optical system.

The zoom lens according to the invention satisfies the following conditional expressions, where v3F is the Abbe number with respect to the d-line of the lens disposed nearest the object, among the third lens group; v3B is the Abbe number with respect to the d-line of the lens disposed nearest the image, among the third lens group; Nd3F is the refractive index with respect to the d-line of the lens disposed nearest object, among the third lens group; and Nd3B is the refractive index of the lens disposed nearest the image, among the third lens group.

$$45 \leq v3F - v3B \leq 70 \quad (3)$$

$$0.4 \leq Nd3B - Nd3F \leq 0.7 \quad (4)$$

Conditional expressions (3) (4) are conditions for realizing favorable aberration correction with respect to light of a wide spectrum of wavelengths, ranging from visible light to near infrared light. Below the lower limit of conditional expression (3), the correction of longitudinal chromatic aberration becomes difficult and imaging performance with respect to near infrared light particularly deteriorates. On the other hand, above the upper limit of conditional expression (3), longitudinal chromatic aberration is over corrected and the balance between longitudinal chromatic aberration and chromatic difference of magnification correction becomes poor. Further, below the lower limit of conditional expression (4), the correction of field curvature become difficult and imaging performance with respect to visible light at the wide angle edge particularly deteriorates. On the other hand, above the upper limit of conditional expression (4), the correction of spherical aberration becomes difficult and in particular, at the wide angle edge, visible light resolution on the axis drops.

The zoom lens according to the invention preferably satisfies the following conditional expression, where SI is the distance from the aperture stop to the image plane; Ft is the F number of the entire optical system, at the telephoto edge; and 2ωt is the angle of view of the entire optical system, at the telephoto edge.

$$2.0 \leq SI \times Ft/2\omega t \leq 4.5 \tag{5}$$

Conditional expression (5) is a condition for enabling a bright F number and high zoom ratio without sacrificing the compactness of the optical system. Below the lower limit of conditional expression (5), lengthening of the focal length of the telephoto edge becomes difficult, i.e., a desirable zoom ratio cannot be obtained. On the other hand, above the upper limit of conditional expression (5), the distance from the image plane to the aperture stop increases, which is detrimental to reducing the size of the optical system.

The zoom lens according to the invention preferable satisfies the following conditional expression, where ft is the focal length of the entire optical system, at the telephoto edge and f1 is the focal length of first lens group.

$$0.3 \leq ft/f1 \leq 0.6 \tag{6}$$

Conditional expression (6) is a condition for favorably correcting various types of aberration over the entire zoom range. Below the lower limit of conditional expression (6), the refractive power of the first lens group becomes too weak, making correction of coma occurring at the telephoto edge particularly difficult and peripheral resolution drops. On the other hand, above the upper limit of conditional expression (6), the refractive power of the first lens group becomes too strong and in particular, spherical aberration occurring at the telephoto edge becomes over corrected and imaging performance deteriorates.

The zoom lens according to the invention preferably satisfies the following conditional expression, where v11 is the Abbe number with respect to the d-line of the lens disposed nearest the object, among the first lens group; v12 is the Abbe number with respect to the d-line of the lens disposed second nearest the object, among the first lens group; D is the distance from the apex of the surface on the object side of the lens disposed nearest the object, among the first lens group, to the image plane; f3 is the focal length of the third lens group; and ft is the focal length of the entire optical system, at the telephoto edge.

$$50 \leq |v12 - v11| \leq 60 \tag{7}$$

$$2.0 \leq D/ft \leq 2.3 \tag{8}$$

$$0.3 \leq f3/ft \leq 0.6 \tag{9}$$

Conditional expression (7) is a condition for improving imaging performance at the telephoto edge of the optical system. Below the lower limit of conditional expression (7), correction of longitudinal chromatic aberration at the telephoto edge becomes difficult and imaging performance with respect to near infrared light on the axis deteriorates. On the other hand, above the upper limit of conditional expression (7), longitudinal chromatic aberration occurring at the telephoto edge is over corrected and the occurrence of peripheral blue flares becomes prominent.

Conditional expression (8) is a condition for facilitating size reductions of the optical system and a high zoom ratio while improving imaging performance. Below the lower limit of conditional expression (8), if the focal length of the optical system is lengthened, great field curvature occurs and imaging performance deteriorates. On the other hand, above the upper limit of conditional expression (8), if a long focal length of the optical system is attempted to be realized, the overall length of the optical system increases and accommodation in the small imaging apparatus becomes difficult.

Conditional expression (9) is a condition for facilitating size reductions of the optical system while improving imaging performance. Below the lower limit of conditional expression (9), spherical aberration is over corrected, inviting deterioration of imaging performance with respect to near infrared light and prominent field curvature with respect to visible light, and therefore, is not desirable. On the other hand, above the upper limit of conditional expression (9), the positive refractive power of the third lens group becomes too weak and the distance that the third lens group is moved during zooming increases, which is detrimental to reducing the size of the optical system.

In the zoom lens according to the invention, the lens disposed nearest the image, among the third lens group, preferably has at least 1 aspheric surface. Such a configuration enables field curvature with respect to visible light at the wide angle edge of the optical system to be favorably corrected.

Further, in the zoom lens according to the invention, by forming the surface on the image side of the lens disposed nearest the image, among the first lens group, to be aspheric, coma occurring at the telephoto edge of the optical system can be more favorably corrected.

As described, the zoom lens according to the invention realizes favorable correction of aberration with respect to light of a wide spectrum of wavelengths, from visible light to near infrared light and achieves bright, high quality images. In particular, by satisfying the conditional expressions above, the zoom lens is compact and can favorably correct various types of aberration caused by deterioration of imaging performance with respect to light of a wide spectrum of wavelengths. In addition, the zoom lens further enables a high zoom ratio.

Hereinafter, with reference to the accompanying drawings, embodiments of the zoom lens according to the invention will be described in detail. Nonetheless, the invention is not limited by the embodiments described hereinafter.

FIG. 1 is a cross sectional view (along the optical axis) of the zoom lens according to a first embodiment.

The zoom lens includes sequentially from a non-depicted object (object side), a first lens group $G_{11}$ having a positive refractive power, a second lens group $G_{12}$ having a negative refractive power, an aperture stop STOP prescribing a given aperture, and a third lens group $G_{13}$ having a positive refractive power. Between the third lens group $G_{13}$ and an image plane IMG, a cover glass CG is disposed. The cover glass CG is disposed as necessary and may be omitted accordingly. At the image plane IMG, the light receiving surface of a solid state image sensor, such as a CCD and CMOS, is disposed.

The first lens group $G_{11}$ includes sequentially from the object side, a negative lens $L_{111}$ and a positive lens $L_{112}$. The negative lens $L_{111}$ and the positive lens $L_{112}$ are cemented.

The second lens group $G_{12}$ includes sequentially from the object side, a negative lens $L_{121}$, a negative lens $L_{122}$, and a positive lens $L_{123}$. The negative lens $L_{122}$ and the positive lens $L_{123}$ are cemented.

The third lens group $G_{13}$ includes sequentially from the object side, a front group $G_{13F}$ having a positive refractive power, a middle group $G_{13M}$ having a negative refractive power, and a rear group $G_{13R}$ having a positive refractive power. The front group $G_{13F}$ is formed by a positive lens $L_{131}$. Both surfaces of the positive lens $L_{131}$ are aspheric. The middle group $G_{13M}$ includes sequentially from the object side, a positive lens $L_{132}$ and a negative lens $L_{133}$. The positive lens $L_{132}$ and the negative lens $L_{133}$ are cemented. The rear group $G_{13R}$ is formed by a positive lens $L_{134}$. Both surfaces of the positive lens $L_{134}$ are aspheric.

In the zoom lens, the third lens group $G_{13}$ is moved along the optical axis from the image plane IMG side toward the object side to zoom from the wide angle edge to the telephoto edge. The second lens group $G_{12}$ is moved along the optical axis from the object side toward the image plane IMG side to zoom and correct variation of the image plane position.

Here, various values related to the zoom lens according to the first embodiment are given.

(Lens data)

| | | | |
|---|---|---|---|
| $r_1 = 21.0455$ | $d_1 = 1.00$ | $nd_1 = 1.84666$ | $vd_1 = 23.78$ |
| $r_2 = 16.4474$ | $d_2 = 3.74$ | $nd_2 = 1.49700$ | $vd_2 = 81.61$ |
| $r_3 = -92.1282$ | $d_3 = D(3)$ (variable) | | |
| $r_4 = 106.9383$ | $d_4 = 0.70$ | $nd_3 = 1.48749$ | $vd_3 = 70.44$ |
| $r_5 = 16.8159$ | $d_5 = 1.81$ | | |
| $r_6 = -14.2110$ | $d_6 = 0.70$ | $nd_4 = 1.74330$ | $vd_4 = 49.22$ |
| $r_7 = 16.5105$ | $d_7 = 1.71$ | $nd_5 = 1.94595$ | $vd_5 = 17.98$ |
| $r_8 = 51.4001$ | $d_8 = D(8)$ (variable) | | |
| $r_9 = \infty$ (aperture stop) | $d_9 = D(9)$ (variable) | | |
| $r_{10} = 7.8560$ (aspheric surface) | $d_{10} = 4.85$ | $nd_6 = 1.49710$ | $vd_6 = 81.56$ |
| $r_{11} = -10.9863$ (aspheric surface) | $d_{11} = 0.10$ | | |
| $r_{12} = 7.2168$ | $d_{12} = 3.46$ | $nd_7 = 1.49700$ | $vd_7 = 81.61$ |
| $r_{13} = -27.4506$ | $d_{13} = 0.60$ | $nd_8 = 1.74077$ | $vd_8 = 27.76$ |
| $r_{14} = 4.2368$ | $d_{14} = 2.11$ | | |
| $r_{15} = 17.4705$ (aspheric surface) | $d_{15} = 2.43$ | $nd_9 = 2.00178$ | $vd_9 = 19.32$ |
| $r_{16} = 175.6659$ (aspheric surface) | $d_{16} = D(16)$ (variable) | | |
| $r_{17} = \infty$ | $d_{17} = 1.20$ | $nd_{10} = 1.51633$ | $vd_{10} = 64.14$ |
| $r_{18} = \infty$ | $d_{18} = D(18)$ | | |
| $r_{19} = \infty$ (image plane) | | | |

Constants of the cone (K) and aspheric coefficients (A, B, C, D)

(tenth plane)

$K = 0.3108$,
$A = -8.53992 \times 10^{-5}$, $B = 1.75385 \times 10^{-6}$,
$C = -5.35157 \times 10^{-8}$, $D = 2.95608 \times 10^{-10}$ (eleventh plane)

$K = 1.0000$,
$A = 5.40631 \times 10^{-4}$, $B = -4.79433 \times 10^{-6}$,
$C = 3.63934 \times 10^{-8}$, $D = -4.02089 \times 10^{-10}$ (fifteenth plane)

$K = 1.0000$,
$A = 1.47616 \times 10^{-3}$, $B = -3.88377 \times 10^{-5}$,
$C = 2.59543 \times 10^{-6}$, $D = -1.23690 \times 10^{-8}$ (sixteenth plane)

$K = 1.0000$,
$A = 1.07552 \times 10^{-3}$, $B = -4.09025 \times 10^{-5}$,
$C = 1.31670 \times 10^{-6}$, $D = 5.58828 \times 10^{-8}$ (Zoom data)

| | Wide angle edge | Telephoto edge |
|---|---|---|
| f (focal length of entire optical system) | 8.97 | 22.88 |
| F number | 1.65 | 2.08 |
| 2ω(angle of view) | 45.90 | 17.10 |
| D(3) | 0.7271 | 9.6542 |
| D(8) | 12.0675 | 3.1404 |
| D(9) | 4.6261 | 2.1000 |
| D(16) | 3.3218 | 5.8478 |
| D(18) | 1.6123 | 1.5929 | fw(focal length of entire optical system, at wide angle edge) = 8.97
ft(focal length of entire optical system, at telephoto edge) = 21.88
Ft(F number of entire optical system, at telephoto edge) = 2.08
f1(first lens group $G_{11}$ focal length of) = 40.90
f2(second lens group $G_{12}$ focal length of) = -11.56
f3(third lens group $G_{13}$ focal length of) = 10.60
SI(distance from aperture stop STOP to image plane IMG) = 24.34
D(distance from apex of surface on object side of negative lens $L_{111}$ to image plane IMG) = 46.40
2ωt(angle of view of entire optical system, at telephoto edge) = 17.10
$v11$(Abbe number for d-line of negative lens $L_{111}$) = 23.78
$v12$(Abbe number for d-line of positive lens $L_{112}$) = 81.61
$v3F$(Abbe number for d-line of positive lens $L_{131}$) = 81.56
$v3B$(Abbe number for d-line of positive lens $L_{134}$) = 19.32
Nd3F(refractive index for d-line of positive lens $L_{131}$) = 1.50
Nd3B(refractive index for d-line of positive lens $L_{134}$) = 2.00
(Values related to conditional expression (1))
fw/f3 = 0.85
(Values related to conditional expression (2))
f3/f2 = -0.92
(Values related to conditional expression (3))
$v3F - v3B$ = 62.24
(Values related to conditional expression (4))
Nd3B − Nd3F = 0.50
(Values related to conditional expression (5))
SI × Ft/2ωt = 2.96
(Values related to conditional expression (6))
ft/f1 = 0.53
(Values related to conditional expression (7))
$|v12 - v11|$ = 57.83
(Values related to conditional expression (8))
D/ft = 2.12
(Values related to conditional expression (9))
f3/ft = 0.48

FIG. 2 is a diagram of various types of aberration occurring in the zoom lens according to the first embodiment. In the diagram, g indicates the wavelength aberration corresponding to g-line (λ=435.83 nm), d indicates the wavelength aberration corresponding to d-line (λ=587.56 nm), and C indicates the wavelength aberration corresponding to C-line (λ=656.27 nm). S and M shown with respect to astigmatism, respectively indicate aberration at the sagittal image plane and at the meridonal image plane.

Figure 3:
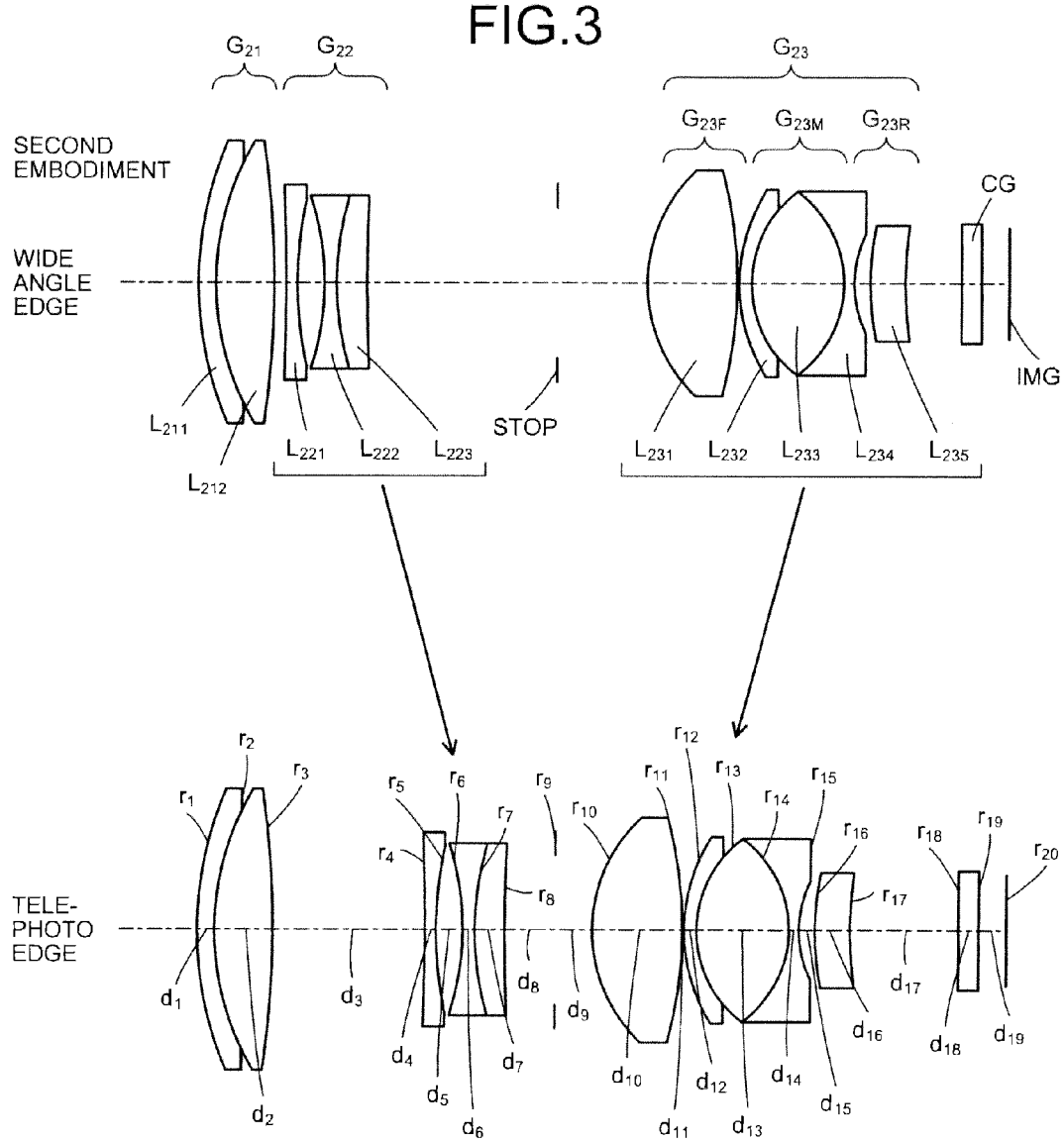
FIG. 3 is a cross sectional view (along the optical axis) of the zoom lens according to a second embodiment.

FIG. 3 is a cross sectional view (along the optical axis) of the zoom lens according to a second embodiment. The zoom lens includes sequentially from a non-depicted object (object side), a first lens group $G_{21}$ having a positive refractive power, a second lens group $G_{22}$ having a negative refractive power, the aperture stop STOP prescribing a given aperture, and a third lens group $G_{23}$ having a positive refractive power. Between the third lens group $G_{23}$ and the image plane IMG, the cover glass CG is disposed. The cover glass CG is disposed as necessary and may be omitted accordingly. At the image plane IMG, the light receiving surface of a solid state image sensor, such as a CCD and CMOS, is disposed.

The first lens group $G_{21}$ includes sequentially from the object side, a negative lens $L_{211}$ and a positive lens $L_{212}$. The negative lens $L_{211}$ and the positive lens $L_{212}$ are cemented.

The second lens group $G_{22}$ includes sequentially from the object side, a negative lens $L_{221}$, a negative lens $L_{222}$, and a positive lens $L_{223}$. The negative lens $L_{222}$ and the positive lens $L_{223}$ are cemented.

The third lens group $G_{23}$ includes sequentially from the object side, a front group $G_{23F}$ having a positive refractive power, a middle group $G_{23M}$ having a negative refractive power, and a rear group $G_{23R}$ having a positive refractive power. The front group $G_{23F}$ is formed by a positive lens $L_{231}$. Both surfaces of the positive lens $L_{231}$ as aspheric. The middle group $G_{23M}$ includes sequentially from the object side, a negative lens $L_{232}$, a positive lens $L_{233}$, and a negative lens $L_{234}$. The negative lens $L_{232}$, the positive lens $L_{233}$, and the negative lens $L_{234}$ are cemented. The rear group $G_{23R}$ is formed by a positive lens $L_{235}$. Both surfaces of the positive lens $L_{235}$ are aspheric.

In the zoom lens, the third lens group $G_{23}$ is moved along the optical axis from the image plane IMG side toward the object side to zoom from the wide angle edge to the telephoto edge. The second lens group $G_{22}$ is moved along the optical axis from the object side toward the image plane IMG side to zoom and correct variation of the image plane position.

Here, various values related to the zoom lens according to the second embodiment are given.

(Lens data)

| | | | |
|---|---|---|---|
| $r_1 = 23.7766$ | $d_1 = 1.00$ | $nd_1 = 1.84666$ | $vd_1 = 23.78$ |
| $r_2 = 18.1792$ | $d_2 = 3.29$ | $nd_2 = 1.49700$ | $vd_2 = 81.61$ |
| $r_3 = -61.9181$ | $d_3 = D(3)$ (variable) | | |
| $r_4 = -106.9398$ | $d_4 = 0.70$ | $nd_3 = 1.48749$ | $vd_3 = 70.44$ |
| $r_5 = 20.5274$ | $d_5 = 1.59$ | | |
| $r_6 = -13.8966$ | $d_6 = 0.70$ | $nd_4 = 1.74330$ | $vd_4 = 49.22$ |
| $r_7 = 19.3235$ | $d_7 = 1.67$ | $nd_5 = 1.94595$ | $vd_5 = 17.98$ |
| $r_8 = 85.5777$ | $d_8 = D(8)$ (variable) | | |
| $r_9 = \infty$ (aperture stop) | $d_9 = D(9)$ (variable) | | |
| $r_{10} = 7.7614$ (aspheric surface) | $d_{10} = 5.21$ | $nd_6 = 1.49710$ | $vd_6 = 81.56$ |
| $r_{11} = -16.4757$ (aspheric surface) | $d_{11} = 0.10$ | | |
| $r_{12} = 9.9292$ | $d_{12} = 0.70$ | $nd_7 = 1.92286$ | $vd_7 = 20.88$ |
| $r_{13} = 6.5000$ | $d_{13} = 5.37$ | $nd_8 = 1.49700$ | $vd_8 = 81.61$ |
| $r_{14} = -6.4562$ | $d_{14} = 0.60$ | $nd_9 = 1.51680$ | $vd_9 = 64.20$ |
| $r_{15} = 5.8297$ | $d_{15} = 0.91$ | | |
| $r_{16} = 12.9478$ (aspheric surface) | $d_{16} = 2.00$ | $nd_{10} = 2.00178$ | $vd_{10} = 19.32$ |
| $r_{17} = 19.0187$ (aspheric surface) | $d_{17} = D(17)$ (variable) | | |
| $r_{18} = \infty$ | $d_{18} = 1.20$ | $nd_{11} = 1.51633$ | $vd_{11} = 64.14$ |
| $r_{19} = \infty$ | $d_{19} = D(19)$ | | |
| $r_{20} = \infty$ (image plane) | | | |

Constants of the cone (K) and aspheric coefficients (A, B, C, D)

(tenth plane)

$K = 0.3618$,
$A = -5.94338 \times 10^{-5}$, $B = 1.24856 \times 10^{-6}$,
$C = -3.22426 \times 10^{-8}$, $D = 4.93011 \times 10^{-10}$ (eleventh plane)

$K = 1.0000$,
$A = 3.17878 \times 10^{-4}$, $B = -2.60377 \times 10^{-6}$,
$C = 2.22080 \times 10^{-8}$, $D = -1.23913 \times 10^{-11}$ (sixteenth plane)

$K = 1.0000$,
$A = 1.93727 \times 10^{-4}$, $B = -4.55959 \times 10^{-5}$,
$C = -2.33607 \times 10^{-6}$, $D = 1.90081 \times 10^{-8}$ (seventeenth plane)

$K = 1.0000$,
$A = 2.84278 \times 10^{-4}$, $B = -5.45387 \times 10^{-5}$,
$C = -4.14270 \times 10^{-6}$, $D = 2.40182 \times 10^{-7}$ (Zoom data)

| | Wide angle edge | Telephoto edge |
|---|---|---|
| f (focal length of entire optical system) | 8.97 | 21.86 |
| F number | 1.57 | 2.10 |
| 2ω(angle of view) | 45.70 | 17.00 |
| D(3) | 0.6504 | 8.8005 |
| D(8) | 11.0012 | 2.8510 |
| D(9) | 5.2715 | 2.2000 |
| D(17) | 3.3371 | 6.4086 |
| D(19) | 1.4525 | 1.4275 | fw(focal length of entire optical system, at wide angle edge) = 8.97
ft(focal length of entire optical system, at telephoto edge) = 21.86
Ft(F number of entire optical system, at telephoto edge) = 2.10
f1(first lens group $G_{21}$ focal length of) = 41.11
f2(second lens group $G_{22}$ focal length of) = -11.67
f3(third lens group $G_{23}$ focal length of) = 10.21
SI(distance from aperture stop STOP to image plane IMG) = 26.19
D(distance from apex of surface on object side of negative lens $L_{211}$ to image plane IMG) = 46.40
2ωt(angle of view of entire optical system, at telephoto edge) = 17.00
υ11(Abbe number for d-line of negative lens $L_{211}$) = 23.78
υ12(Abbe number for d-line of positive lens $L_{212}$) = 81.61
υ3F(Abbe number for d-line of positive lens $L_{231}$) = 81.56
υ3B(Abbe number for d-line of positive lens $L_{235}$) = 19.32
Nd3F(refractive index for d-line of positive lens $L_{231}$) = 1.50
Nd3B(refractive index for d-line of positive lens $L_{235}$) = 2.00
(Values related to conditional expression (1))
fw/f3 = 0.88
(Values related to conditional expression (2))
f3/f2 = -0.87
(Values related to conditional expression (3))
υ3F - υ3B = 62.24
(Values related to conditional expression (4))
Nd3B - Nd3F = 0.50
(Values related to conditional expression (5))
SI × Ft/2ωt = 3.24
(Values related to conditional expression (6))
ft/f1 = 0.53
(Values related to conditional expression (7))
|υ12 - υ11| = 57.83
(Values related to conditional expression (8))
D/ft = 2.12
(Values related to conditional expression (9))
f3/ft = 0.47

FIG. 4 is a diagram of various types of aberration occurring in the zoom lens according to the second embodiment. In the diagram, g indicates the wavelength aberration corresponding to g-line (λ=435.83 nm), d indicates the wavelength aberration corresponding to d-line (λ=587.56 nm), and C indicates the wavelength aberration corresponding to C-line (λ=656.27 nm). S and M shown with respect to astigmatism, respectively indicate aberration at the sagittal image plane and at the meridonal image plane.

Figure 5:
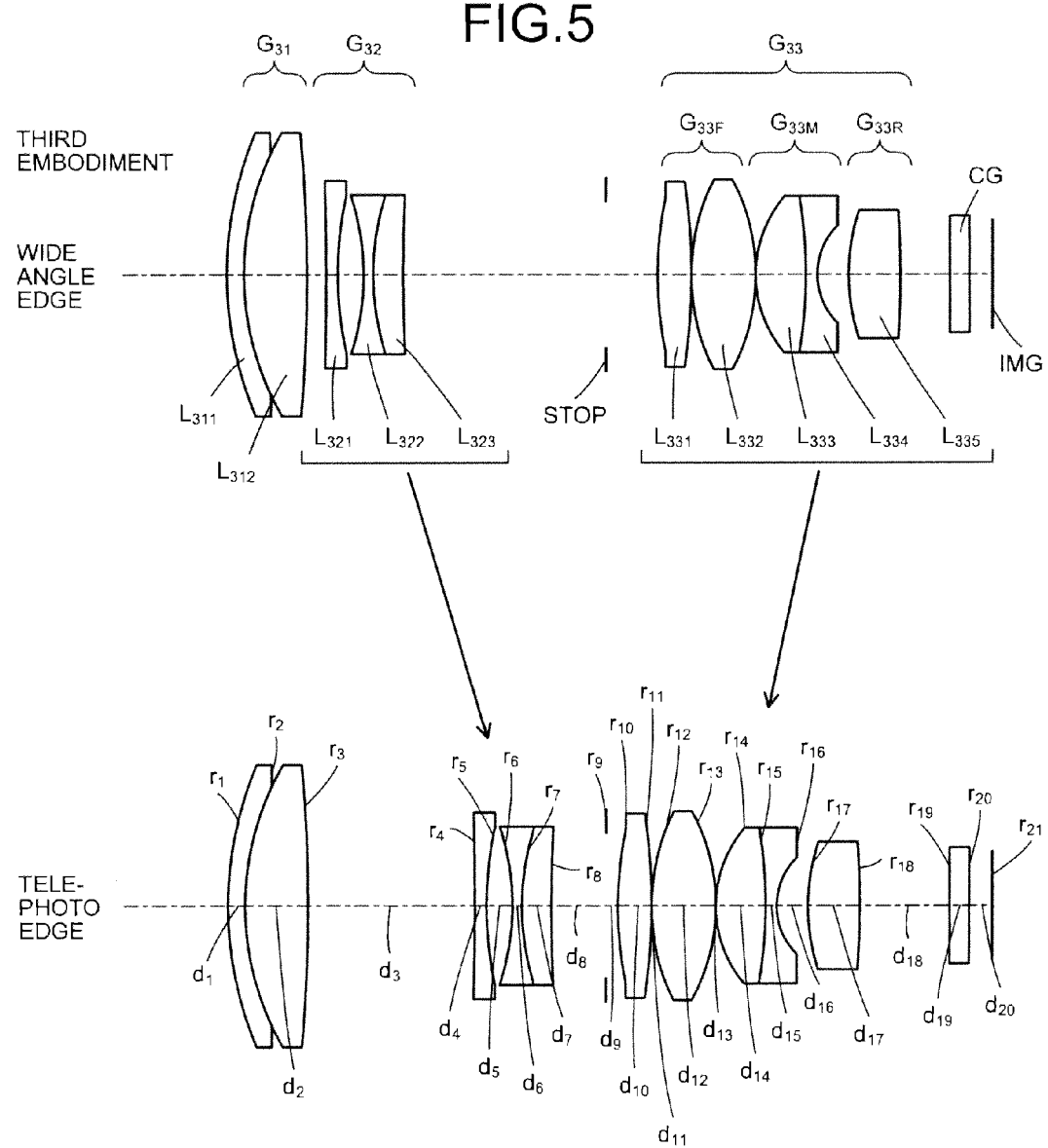
FIG. 5 is a cross sectional view (along the optical axis) of the zoom lens according to a third embodiment.

FIG. 5 is a cross sectional view (along the optical axis) of the zoom lens according to a third embodiment. The zoom lens includes sequentially from a non-depicted object (object side), a first lens group $G_{31}$ having a positive refractive power, a second lens group $G_{32}$ having a negative refractive power, the aperture stop STOP prescribing a given aperture, and a third lens group $G_{33}$ having a positive refractive power. Between the third lens group $G_{33}$ and the image plane IMG, the cover glass CG is disposed. The cover glass CG is disposed as necessary and may be omitted accordingly. At the image plane IMG, the light receiving surface of a solid state image sensor, such as a CCD and CMOS, is disposed.

The first lens group $G_{31}$ includes sequentially from the object side, a negative lens $L_{311}$ and a positive lens $L_{312}$. The negative lens $L_{311}$ and the positive lens $L_{312}$ are cemented.

The second lens group $G_{32}$ includes sequentially from the object side, a negative lens $L_{321}$, a negative lens $L_{322}$, and a positive lens $L_{323}$. The negative lens $L_{322}$ and the positive lens $L_{323}$ are cemented.

The third lens group $G_{33}$ includes sequentially from the object side, a front group $G_{33F}$ having a positive refractive power, a middle group $G_{33M}$ having a negative refractive power, and a rear group $G_{33R}$ having a positive refractive power. The front group $G_{33F}$ includes sequentially from the object side, a positive lens $L_{331}$ and a positive lens $L_{332}$. Both surfaces of the positive lens $L_{331}$ are aspheric. The middle group $G_{33M}$ includes sequentially from the object side, a positive lens $L_{333}$ and a negative lens $L_{334}$. The positive lens $L_{333}$ and the negative lens $L_{334}$ are cemented. The rear group $G_{33R}$ is formed a positive lens $L_{335}$. Both surfaces of the positive lens $L_{335}$ are aspheric.

In the zoom lens, the third lens group $G_{33}$ is moved along the optical axis from the image plane IMG side toward the object side to zoom from the wide angle edge to the telephoto edge. The second lens group $G_{32}$ is moved along the optical axis from the object side toward the image plane IMG side to zoom and correct variation of the image plane position.

Here, various values related to the zoom lens according to the third embodiment are given.

(Lens data)

| | | | |
|---|---|---|---|
| $r_1 = 20.7861$ | $d_1 = 1.00$ | $nd_1 = 1.84666$ | $\upsilon d_1 = 23.78$ |
| $r_2 = 16.1420$ | $d_2 = 3.93$ | $nd_2 = 1.49700$ | $\upsilon d_2 = 81.61$ |
| $r_3 = -100.0738$ | $d_3 = D(3)$ (variable) | | |
| $r_4 = -69.0629$ | $d_4 = 0.70$ | $nd_3 = 1.48749$ | $\upsilon d_3 = 70.44$ |
| $r_5 = 21.6360$ | $d_5 = 1.62$ | | |
| $r_6 = -15.6234$ | $d_6 = 0.70$ | $nd_4 = 1.69680$ | $\upsilon d_4 = 55.46$ |
| $r_7 = 17.7459$ | $d_7 = 1.65$ | $nd_5 = 1.94595$ | $\upsilon d_5 = 17.98$ |
| $r_8 = 44.1106$ | $d_8 = D(8)$ (variable) | | |
| $r_9 = \infty$ (aperture stop) | $d_9 = D(9)$ (variable) | | |
| $r_{10} = 16.8213$ (aspheric surface) | $d_{10} = 2.07$ | $nd_6 = 1.59201$ | $\upsilon d_6 = 67.02$ |
| $r_{11} = -55.3555$ (aspheric surface) | $d_{11} = 0.10$ | | |
| $r_{12} = 14.3575$ | $d_{12} = 3.83$ | $nd_7 = 1.49700$ | $\upsilon d_7 = 81.61$ |
| $r_{13} = -12.4482$ | $d_{13} = 0.10$ | | |
| $r_{14} = 8.0118$ | $d_{14} = 2.99$ | $nd_8 = 1.49700$ | $\upsilon d_8 = 81.61$ |
| $r_{15} = -30.382$ | $d_{15} = 0.70$ | $nd_9 = 1.76182$ | $\upsilon d_9 = 26.61$ |
| $r_{16} = 4.3343$ | $d_{16} = 1.86$ | | |
| $r_{17} = 21.8114$ (aspheric surface) | $d_{17} = 3.06$ | $nd_{10} = 2.00178$ | $\upsilon d_{10} = 19.32$ |
| $r_{18} = -100.0000$ (aspheric surface) | $d_{18} = D(18)$ (variable) | | |
| $r_{19} = \infty$ | $d_{19} = 1.20$ | $nd_{11} = 1.51633$ | $\upsilon d_{11} = 64.14$ |
| $r_{20} = \infty$ | $d_{20} = D(20)$ | | |
| $r_{21} = \infty$ (image plane) | | | |

Constants of the cone (K) and aspheric coefficients (A, B, C, D)

(tenth plane)

K = −14.1796,
A = 1.84965 × 10$^{-4}$, B = −9.77461 × 10$^{-6}$,
C = −7.48158 × 10$^{-8}$, D = −1.75002 × 10$^{-10}$ (eleventh plane)

K = 1.0000,
A = 1.07518 × 10$^{-4}$, B = −8.50720 × 10$^{-7}$,
C = −1.97917 × 10$^{-7}$, D = 2.17517 × 10$^{-9}$ (seventeenth plane)

K = 1.0000,
A = 5.88022 × 10$^{-4}$, B = 1.04789 × 10$^{-5}$,
C = −8.27725 × 10$^{-7}$, D = 1.26147 × 10$^{-7}$ (eighteenth plane)

K = 1.0000,
A = 1.45999 × 10$^{-4}$, B = −3.01105 × 10$^{-6}$,
C = −1.27293 × 10$^{-6}$, D = 8.14173 × 10$^{-8}$ (Zoom data)

| | Wide angle edge | Telephoto edge |
|---|---|---|
| f (focal length of entire optical system) | 8.97 | 21.88 |
| F number | 1.62 | 2.01 |
| 2ω(angle of view) | 44.09 | 16.50 |
| D(3) | 1.1293 | 10.2355 |
| D(8) | 12.2725 | 3.1663 |
| D(9) | 3.2824 | 0.9000 |
| D(18) | 3.1000 | 5.4824 |
| D(20) | 1.4720 | 1.4621 | fw(focal length of entire optical system, at wide angle edge) = 8.97
ft(focal length of entire optical system, at telephoto edge) = 21.88
Ft(F number of entire optical system, at telephoto edge) = 2.01
f1(first lens group $G_{31}$ focal length of) = 41.41
f2(second lens group $G_{32}$ focal length of) = −11.67
f3(third lens group $G_{33}$ focal length of) = 10.48
SI(distance from aperture stop STOP to image plane IMG) = 23.80
D(distance from apex of surface on object side of negative lens $L_{311}$ to the image plane IMG) = 46.40
2ωt(angle of view of entire optical system, at telephoto edge) = 16.50
$\upsilon 11$(Abbe number for d-line of negative lens $L_{311}$) = 23.78
$\upsilon 12$(Abbe number for d-line of positive lens $L_{312}$) = 81.61
$\upsilon 3F$(Abbe number for d-line of positive lens $L_{331}$) = 67.02
$\upsilon 3B$(Abbe number for d-line of positive lens $L_{335}$) = 19.32
Nd3F(refractive index for d-line of positive lens $L_{331}$) = 1.59
Nd3B(refractive index for d-line of positive lens $L_{335}$) = 2.00
(Values related to conditional expression (1))
fw/f3 = 0.86
(Values related to conditional expression (2))
f3/f2 = −0.90
(Values related to conditional expression (3))
$\upsilon 3F − \upsilon 3B$ = 47.70
(Values related to conditional expression (4))
Nd3B − Nd3F = 0.41
(Values related to conditional expression (5))
SI × Ft/2ωt = 2.89
(Values related to conditional expression (6))
ft/f1 = 0.53
(Values related to conditional expression (7))
|$\upsilon 12 − \upsilon 11$| = 57.83
(Values related to conditional expression (8))
D/ft = 2.12
(Values related to conditional expression (9))
f3/ft = 0.48

FIG. 6 is a diagram of various types of aberration occurring in the zoom lens according to the third embodiment. In the diagram, g indicates the wavelength aberration corresponding to g-line (λ=435.83 nm), d indicates the wavelength aberration corresponding to d-line (λ=587.56 nm), and C indicates the wavelength aberration corresponding to C-line (λ=656.27 nm). S and M shown with respect to astigmatism, respectively indicate aberration at the sagittal image plane and at the meridonal image plane.

Figure 7:
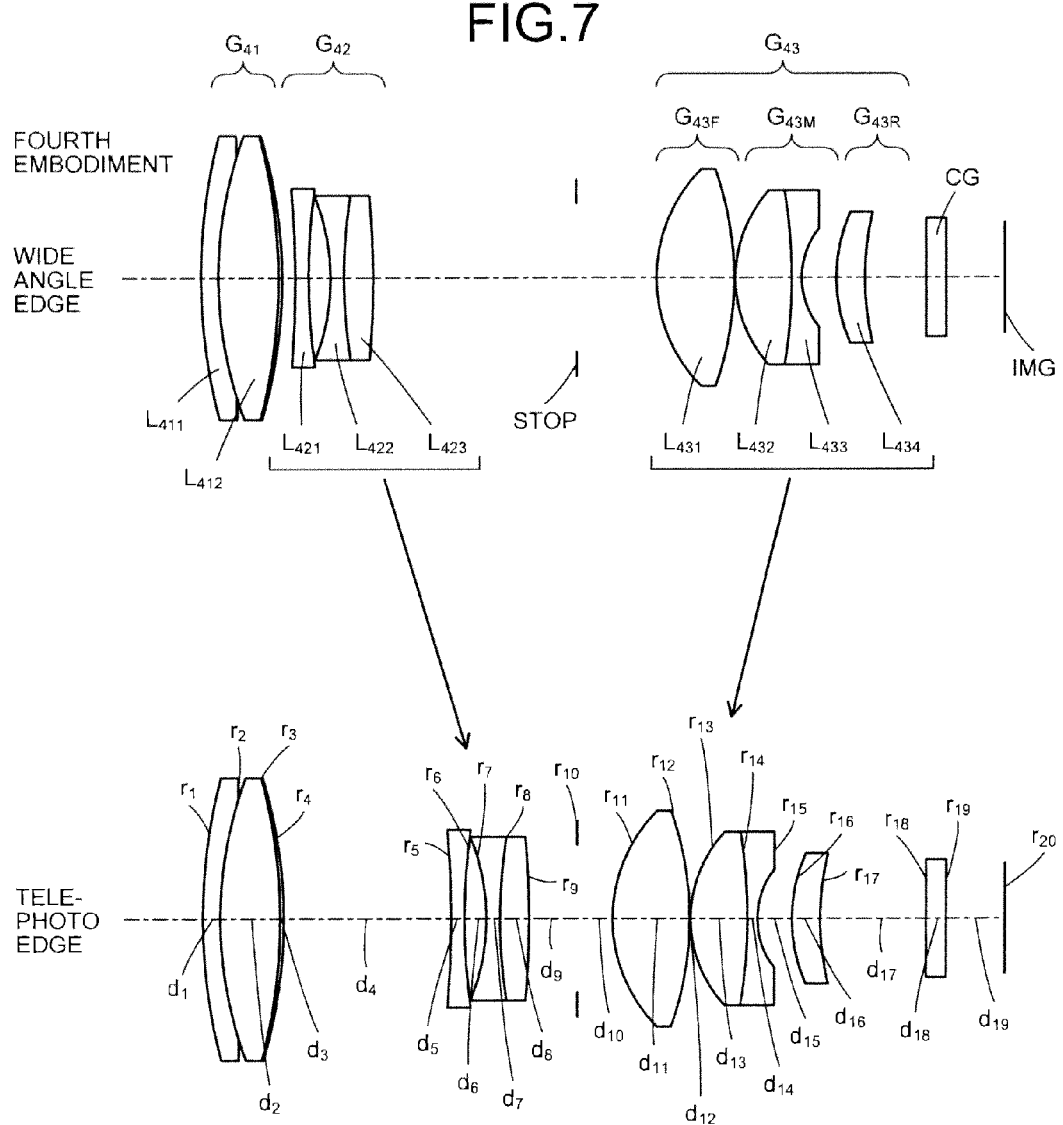
FIG. 7 is a cross sectional view (along the optical axis) of the zoom lens according to a fourth embodiment.

FIG. 7 is a cross sectional view (along the optical axis) of the zoom lens according to a fourth embodiment. The zoom lens includes sequentially from a non-depicted object (object side), a first lens group $G_{41}$ having a positive refractive power, a second lens group $G_{42}$ having a negative refractive power, the aperture stop STOP prescribing a given aperture, and a third lens group $G_{43}$ having a positive refractive power. Between the third lens group $G_{43}$ and the image plane IMG, the cover glass CG is disposed. The cover glass CG is disposed as necessary and may be omitted accordingly. At the image plane IMG, the light receiving surface of a solid state image sensor, such as a CCD and CMOS, is disposed.

The first lens group $G_{41}$ includes sequentially from the object side, a negative lens $L_{411}$ and a positive lens $L_{412}$. The negative lens $L_{411}$ and the positive lens $L_{412}$ are cemented. The surface on the image plane IMG side of the positive lens $L_{412}$ is aspheric and formed by bonding/molding.

The second lens group $G_{42}$ includes sequentially from the object side, a negative lens $L_{421}$, a negative lens $L_{422}$, and a positive lens $L_{423}$. The negative lens $L_{422}$ and the positive lens $L_{423}$ are cemented.

The third lens group $G_{43}$ includes sequentially from the object side, a front group $G_{43F}$ having a positive refractive power, a middle group $G_{43M}$ having a negative refractive power, and a rear group $G_{43R}$ having a positive refractive power. The front group $G_{43F}$ is formed by a positive lens $L_{431}$. Both surfaces of the positive lens $L_{431}$ are aspheric. The middle group $G_{43M}$ includes sequentially from the object side, a positive lens $L_{432}$ and a negative lens $L_{433}$. The positive lens $L_{432}$ and the negative lens $L_{433}$ are cemented. The rear group $G_{43R}$ is formed by a positive lens $L_{434}$. Both surfaces of the positive lens $L_{434}$ are aspheric.

In the zoom lens, the third lens group $G_{43}$ is moved along the optical axis from the image plane IMG side toward the object side to zoom from the wide angle edge to the telephoto edge. The second lens group $G_{42}$ is moved along the optical axis from the object side toward the image plane IMG side to zoom and correct variation of the image plane position.

Here, various values related to the zoom lens according to the fourth embodiment are given.

(Lens data)

| | | | |
|---|---|---|---|
| $r_1 = 34.0074$ | $d_1 = 1.00$ | $nd_1 = 1.84666$ | $\upsilon d_1 = 23.78$ |
| $r_2 = 23.8609$ | $d_2 = 3.52$ | $nd_2 = 1.49700$ | $\upsilon d_2 = 81.61$ |
| $r_3 = -32.6063$ | $d_3 = 0.20$ | $nd_3 = 1.53610$ | $\upsilon d_3 = 41.21$ |
| (aspheric surface) | | | |
| $r_4 = -28.9034$ | $d_4 = D(4)$ | | |
| | (variable) | | |
| $r_5 = -54.1596$ | $d_5 = 0.70$ | $nd_4 = 1.83400$ | $\upsilon d_4 = 37.34$ |
| $r_6 = 24.6537$ | $d_6 = 1.38$ | | |
| $r_7 = -12.8079$ | $d_7 = 0.70$ | $nd_5 = 1.74330$ | $\upsilon d_5 = 49.22$ |
| $r_8 = 26.6595$ | $d_8 = 1.75$ | $nd_6 = 1.94595$ | $\upsilon d_6 = 17.98$ |
| $r_9 = -70.2507$ | $d_9 = D(9)$ | | |
| | (variable) | | |
| $r_{10} = \infty$ (aperture stop) | $d_{10} = D(10)$ | | |
| | (variable) | | |
| $r_{11} = 7.9764$ | $d_{11} = 4.50$ | $nd_7 = 1.49710$ | $\upsilon d_7 = 81.56$ |
| (aspheric surface) | | | |
| $r_{12} = -12.3964$ | $d_{12} = 0.10$ | | |
| (aspheric surface) | | | |
| $r_{13} = 7.6077$ | $d_{13} = 3.26$ | $nd_8 = 1.49700$ | $\upsilon d_8 = 81.61$ |
| $r_{14} = -32.7450$ | $d_{14} = 0.60$ | $nd_9 = 1.74077$ | $\upsilon d_9 = 27.76$ |
| $r_{15} = 4.7058$ | $d_{15} = 2.02$ | | |
| $r_{16} = 21.3602$ | $d_{16} = 1.72$ | $nd_{10} = 2.00178$ | $\upsilon d_{10} = 19.32$ |
| (aspheric surface) | | | |
| $r_{17} = 1000.0000$ | $d_{17} = D(17)$ | | |
| (aspheric surface) | (variable) | | |
| $r_{18} = \infty$ | $d_{18} = 1.20$ | $nd_{11} = 1.51633$ | $\upsilon d_{11} = 64.14$ |
| $r_{19} = \infty$ | $d_{19} = D(19)$ | | |
| $r_{20} = \infty$ (image plane) | | | |

-continued

Constants of the cone (κ) and aspheric coefficients (A, B, C, D)

(third plane)

K = 1.0000,
A = 2.13750 × 10⁻⁵, B = −1.72668 × 10⁻⁷,
C = 4.91295 × 10⁻⁹, D = −4.59346 × 10⁻¹¹

(eleventh plane)

K = 0.3735,
A = −6.47603 × 10⁻⁵, B = 1.98553 × 10⁻⁶,
C = −5.98743 × 10⁻⁸, D = 8.86363 × 10⁻¹⁰

(twelfth plane)

K = 1.0000,
A = 5.27835 × 10⁻⁴, B = −4.94554 × 10⁻⁶,
C = 3.13111 × 10⁻⁸, D = 2.35475 × 10⁻¹⁰

(sixteenth plane)

K = 1.0000,
A = 2.03445 × 10⁻³, B = −9.76586 × 10⁻⁶,
C = 1.01726 × 10⁻⁸, D = 1.04485 × 10⁻⁷

(seventeenth plane)

K = 1.0000,
A = 1.73971 × 10⁻³, B = 2.62756 × 10⁻⁵,
C = −3.70304 × 10⁻⁶, D = 3.55335 × 10⁻⁷

(Zoom data)

| | Wide angle edge | Telephoto edge |
|---|---|---|
| f | 8.97 | 21.88 |
| (focal length of entire optical system) | | |
| F number | 1.64 | 2.05 |
| 2ω (angle of view) | 44.09 | 16.50 |
| D(4) | 0.7882 | 9.7003 |
| D(9) | 11.7917 | 2.8795 |
| D(10) | 4.6670 | 2.1000 |
| D(17) | 3.4607 | 6.0277 |
| D(19) | 3.4061 | 3.3836 | fw(focal length of entire optical system, at wide angle edge) = 8.97
ft(focal length of entire optical system, at telephoto edge) = 21.88
Ft(F number of entire optical system, at telephoto edge) = 2.05
f1(first lens group $G_{41}$ focal length of) = 36.89
f2(second lens group $G_{42}$ focal length of) = −11.50
f3(third lens group $G_{43}$ focal length of) = 11.28
SI(distance from aperture stop STOP to image plane IMG) = 24.97
D(distance from apex of surface on object side of negative lens $L_{411}$ to image plane IMG) = 46.40
2ωt(angle of view of entire optical system, at telephoto edge) = 16.50
υ11(Abbe number for d-line of negative lens $L_{411}$) = 23.78
υ12(Abbe number for d-line of positive lens $L_{412}$) = 81.61
υ3F(Abbe number for d-line of positive lens $L_{431}$) = 81.56
υ3B(Abbe number for d-line of positive lens $L_{434}$) = 19.32
Nd3F(refractive index for d-line of positive lens $L_{431}$) = 1.50
Nd3B(refractive index for d-line of positive lens $L_{434}$) = 2.00
(Values related to conditional expression (1))
fw/f3 = 0.79
(Values related to conditional expression (2))
f3/f2 = −0.98
(Values related to conditional expression (3))
υ3F − υ3B = 62.24
(Values related to conditional expression (4))
Nd3B − Nd3F = 0.50
(Values related to conditional expression (5))
SI × Ft/2ωt = 3.10
(Values related to conditional expression (6))
ft/f1 = 0.59
(Values related to conditional expression (7))
|υ12 − υ11| = 57.83
(Values related to conditional expression (8))
D/ft = 2.12
(Values related to conditional expression (9))
f3/ft = 0.52

FIG. 8 is a diagram of various types of aberration occurring in the zoom lens according to the fourth embodiment. In the diagram, g indicates the wavelength aberration corresponding to g-line (λ=435.83 nm), d indicates the wavelength aberration corresponding to d-line (λ=587.56 nm), and C indicates the wavelength aberration corresponding to C-line (λ=656.27 nm). S and M shown with respect to astigmatism, respectively indicate aberration at the sagittal image plane and at the meridonal image plane.

Figure 9:
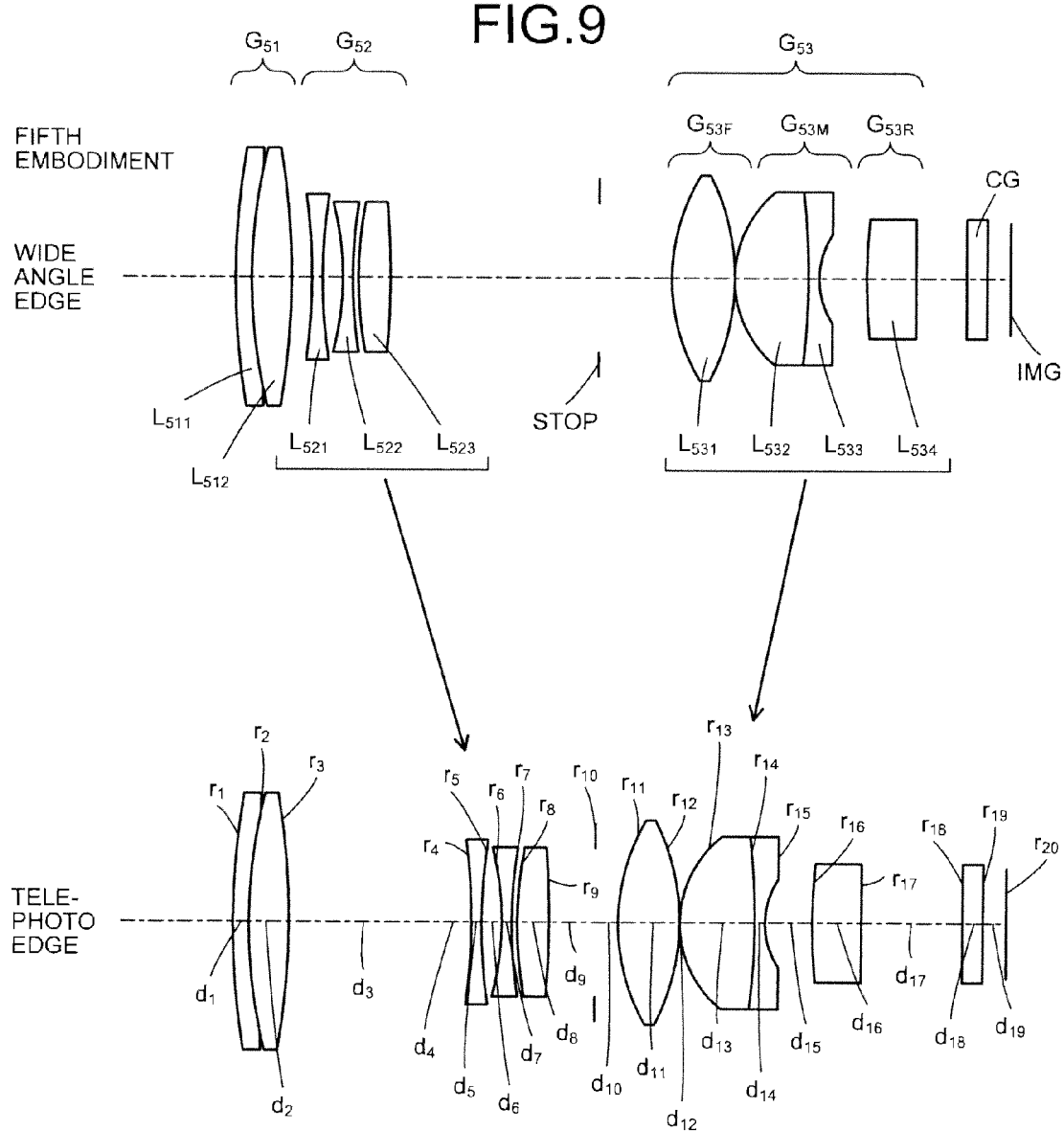
FIG. 9 is a cross sectional view (along the optical axis) of the zoom lens according to a fifth embodiment.

FIG. 9 is a cross sectional view (along the optical axis) of the zoom lens according to a fifth embodiment. The zoom lens includes sequentially from a non-depicted object (object side), a first lens group $G_{51}$ having a positive refractive power, a second lens group $G_{52}$ having a negative refractive power, the aperture stop STOP prescribing a given aperture, and a third lens group $G_{53}$ having a positive refractive power. Between the third lens group $G_{53}$ and the image plane IMG, the cover glass CG is disposed. The cover glass CG is disposed as necessary and may be omitted accordingly. At the image plane IMG, the light receiving surface of a solid state image sensor, such as a CCD and CMOS, is disposed.

The first lens group $G_{51}$ includes sequentially from the object side, a negative lens $L_{511}$ and a positive lens $L_{512}$. The negative lens $L_{511}$ and the positive lens $L_{512}$ are cemented.

The second lens group $G_{52}$ includes sequentially from the object side, a negative lens $L_{521}$, a negative lens $L_{522}$, and a positive lens $L_{523}$.

The third lens group $G_{53}$ includes sequentially from the object side, a front group $G_{53F}$ having a positive refractive power, a middle group $G_{53M}$ having a negative refractive power, and a rear group $G_{53R}$ having a positive refractive power. The front group $G_{53F}$ is formed by a positive lens $L_{531}$. Both surfaces of the positive lens $L_{531}$ as aspheric. The middle group $G_{53M}$ includes sequentially from the object side, a positive lens $L_{532}$ and a negative lens $L_{533}$. The positive lens $L_{532}$ and the negative lens $L_{533}$ are cemented. The rear group $G_{53R}$ is formed by a positive lens $L_{534}$. Both surfaces of the positive lens $L_{534}$ are aspheric.

In the zoom lens, the third lens group $G_{53}$ is moved along the optical axis from the image plane IMG side toward the object side to zoom from the wide angle edge to the telephoto edge. The second lens group $G_{52}$ is moved along the optical axis from the object side toward the image plane IMG side to zoom and correct variation of the image plane position.

Here, various values related to the zoom lens according to the fifth embodiment are given.

(Lens data)

| | | | |
|---|---|---|---|
| $r_1$ = 43.9283 | $d_1$ = 1.00 | $nd_1$ = 1.80518 | $vd_1$ = 25.46 |
| $r_2$ = 33.5341 | $d_2$ = 2.40 | $nd_2$ = 1.49700 | $vd_2$ = 81.61 |
| $r_3$ = −46.8008 | $d_3$ = D(3) (variable) | | |
| $r_4$ = −30.1242 | $d_4$ = 0.60 | $nd_3$ = 1.48749 | $vd_3$ = 70.44 |
| $r_5$ = 31.2211 | $d_5$ = 1.26 | | |
| $r_6$ = −17.1954 | $d_6$ = 0.60 | $nd_4$ = 1.90366 | $vd_4$ = 31.31 |
| $r_7$ = 22.5590 | $d_7$ = 0.31 | | |
| $r_8$ = 24.2649 | $d_8$ = 1.90 | $nd_5$ = 1.94595 | $vd_5$ = 17.98 |
| $r_9$ = −69.3273 | $d_9$ = D(9) (variable) | | |
| $r_{10}$ = ∞ (aperture stop) | $d_{10}$ = D(10) (variable) | | |
| $r_{11}$ = 10.0000 (aspheric surface) | $d_{11}$ = 3.75 | $nd_6$ = 1.49710 | $vd_6$ = 81.56 |
| $r_{12}$ = −14.5049 (aspheric surface) | $d_{12}$ = 0.10 | | |
| $r_{13}$ = 6.7400 | $d_{13}$ = 4.50 | $nd_7$ = 1.49700 | $vd_7$ = 81.61 |
| $r_{14}$ = −37.8814 | $d_{14}$ = 0.60 | $nd_8$ = 1.74077 | $vd_8$ = 27.76 |
| $r_{15}$ = 4.8911 | $d_{15}$ = 2.90 | | |
| $r_{16}$ = 33.1791 (aspheric surface) | $d_{16}$ = 3.00 | $nd_9$ = 2.10205 | $vd_9$ = 16.77 |
| $r_{17}$ = −331.8398 (aspheric surface) | $d_{17}$ = D(17) (variable) | | |
| $r_{18}$ = ∞ | $d_{18}$ = 1.20 | $nd_{10}$ = 1.51633 | $vd_{10}$ = 64.14 |
| $r_{19}$ = ∞ | $d_{19}$ = D(19) | | |
| $r_{20}$ = ∞ (image plane) | | | |

Constants of the cone (κ) and aspheric coefficients (A, B, C, D)

(eleventh plane)

K = 1.0000,
A = −1.13621 × 10⁻⁴, B = −2.59853 × 10⁻⁶,
C = 1.04911 × 10⁻⁷, D = −4.09440 × 10⁻⁹

(twelfth plane)

K = 1.0000,
A = 1.69424 × 10⁻⁴, B = −3.06114 × 10⁻⁷,
C = −4.22065 × 10⁻⁸, D = −1.36612 × 10⁻⁹

(sixteenth plane)

K = 1.0000,
A = 1.94490 × 10⁻⁴, B = −4.13622 × 10⁻⁵,
C = 3.13620 × 10⁻⁶, D = −1.57243 × 10⁻⁷

(seventeenth plane)

K = 1.0000,
A = 1.95439 × 10⁻⁴, B = −1.93329 × 10⁻⁵,
C = 1.45224 × 10⁻⁷, D = −5.54131 × 10⁻⁹

(Zoom data)

| | Wide angle edge | Telephoto edge |
|---|---|---|
| f (focal length of entire optical system) | 9.22 | 21.24 |
| F number | 1.64 | 2.36 |
| 2ω (angle of view) | 38.18 | 15.72 |
| D(3) | 1.2517 | 11.0578 |
| D(9) | 12.6519 | 2.8459 |
| D(10) | 4.3657 | 1.3000 |
| D(17) | 3.1000 | 6.1657 |
| D(19) | 1.2806 | 1.3230 | fw(focal length of entire optical system, at wide angle edge) = 9.22
ft(focal length of entire optical system, at telephoto edge) = 21.24
Ft(F number of entire optical system, at telephoto edge) = 2.36
f1(first lens group $G_{51}$ focal length of) = 51.05
f2(second lens group $G_{52}$ focal length of) = −14.26
f3(third lens group $G_{53}$ focal length of) = 11.46
SI(distance from aperture stop STOP to image plane IMG) = 24.82
D(distance from apex of surface on object side of negative lens $L_{511}$ to image plane IMG) = 46.40
2ωt(angle of view of entire optical system, at telephoto edge) = 15.72
υ11(Abbe number for d-line of negative lens $L_{511}$) = 25.46
υ12(Abbe number for d-line of positive lens $L_{512}$) = 81.61
υ3F(Abbe number for d-line of positive lens $L_{531}$) = 81.56
υ3B(Abbe number for d-line of positive lens $L_{534}$) = 16.77
Nd3F(refractive index for d-line of positive lens $L_{531}$) = 1.50
Nd3B(refractive index for d-line of positive lens $L_{534}$) = 2.10
(Values related to conditional expression (1))
fw/f3 = 0.80
(Values related to conditional expression (2))
f3/f2 = −0.80
(Values related to conditional expression (3))
υ3F − υ3B = 64.79
(Values related to conditional expression (4))
Nd3B − Nd3F = 0.60
(Values related to conditional expression (5))
SI × Ft/2ωt = 3.73
(Values related to conditional expression (6))
ft/f1 = 0.42
(Values related to conditional expression (7))
|υ12 − υ11| = 56.15
(Values related to conditional expression (8))
D/ft = 2.18
(Values related to conditional expression (9))
f3/ft = 0.54

FIG. 10 is a diagram of various types of aberration occurring in the zoom lens according to the fifth embodiment. In the diagram, g indicates the wavelength aberration corresponding to g-line (λ=435.83 nm), d indicates the wavelength aberration corresponding to d-line (λ=587.56 nm), and C indicates the wavelength aberration corresponding to C-line (λ=656.27 nm). S and M shown with respect to astigmatism, respectively indicate aberration at the sagittal image plane and at the meridonal image plane.

Figure 11:
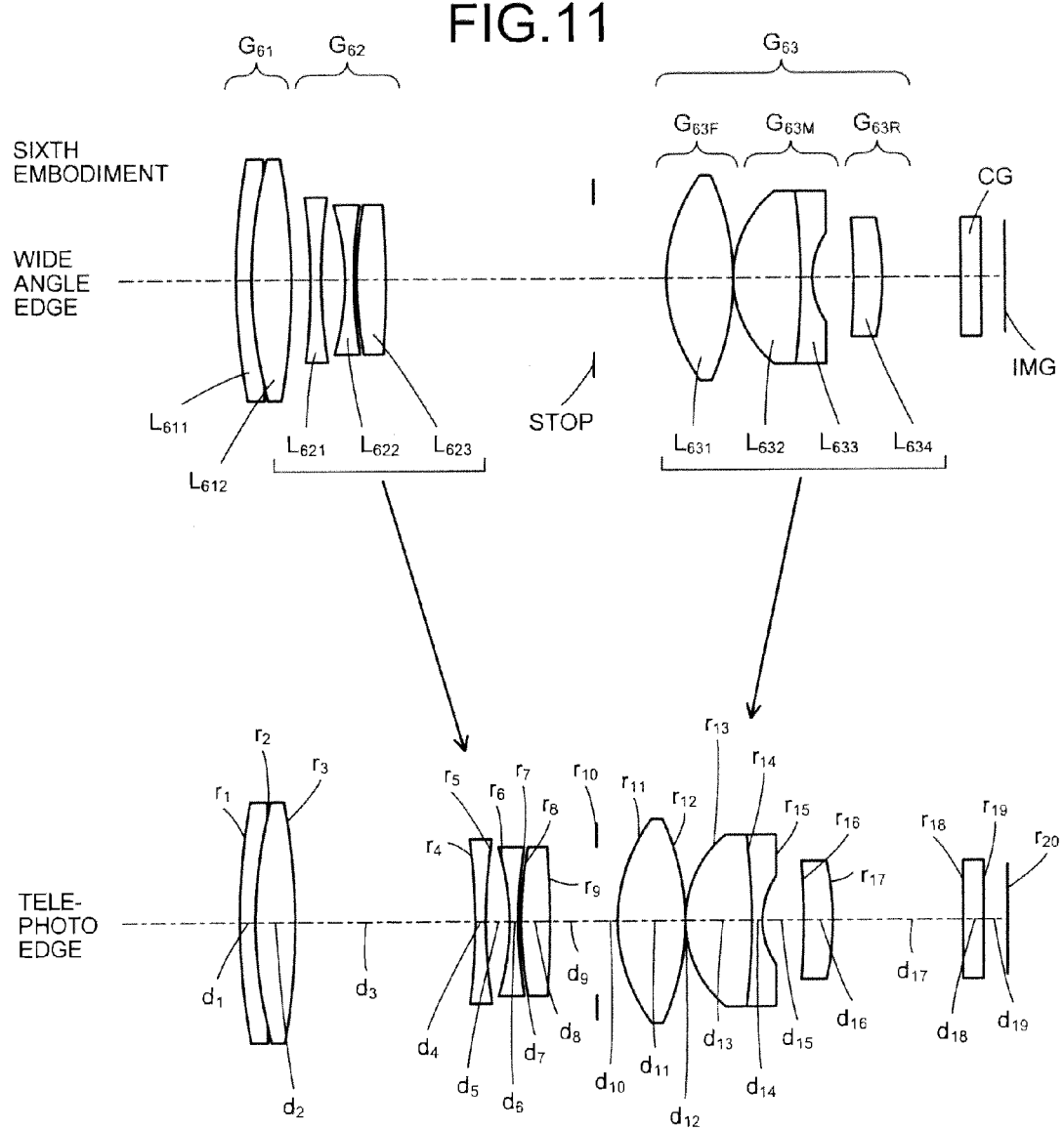
FIG. 11 is a cross sectional view (along the optical axis) of the zoom lens according to a sixth embodiment.

FIG. 11 is a cross sectional view (along the optical axis) of the zoom lens according to a sixth embodiment. The zoom lens includes sequentially from a non-depicted object (object side), a first lens group $G_{61}$ having a positive refractive power, a second lens group $G_{62}$ having a negative refractive power, the aperture stop STOP prescribing a given aperture, and a third lens group $G_{63}$ having a positive refractive power. Between the third lens group $G_{63}$ and the image plane IMG, the cover glass CG is disposed. The cover glass CG is disposed as necessary and may be omitted accordingly. At the image plane IMG, the light receiving surface of a solid state image sensor, such as a CCD and CMOS, is disposed.

The first lens group $G_{61}$ includes sequentially from the object side, a negative lens $L_{611}$ and a positive lens $L_{612}$. The negative lens $L_{611}$ and positive lens $L_{612}$ are cemented.

The second lens group $G_{62}$ includes sequentially from the object side, a negative lens $L_{521}$, a negative lens $L_{522}$, and a positive lens $L_{523}$.

The third lens group $G_{63}$ includes sequentially from the object side, a front group $G_{63F}$ having a positive refractive power, a middle group $G_{63M}$ having a negative refractive power, and a rear group $G_{63R}$ having a positive refractive power. The front group $G_{63F}$ is formed by a positive lens $L_{631}$. Both surfaces of the positive lens $L_{631}$ are aspheric. The middle group $G_{63M}$ includes sequentially from the object side, a positive lens $L_{632}$ and a negative lens $L_{633}$. The positive lens $L_{632}$ and the negative lens $L_{633}$ are cemented. The rear group $G_{63R}$ is formed by a positive lens $L_{634}$.

In the zoom lens, the third lens group $G_{63}$ is moved along the optical axis from the image plane IMG side toward the object side to zoom from the wide angle edge to the telephoto edge. The second lens group $G_{62}$ is moved along the optical axis from the object side toward the image plane IMG side to zoom and correct variation of the image plane position.

Here, various values related to the zoom lens according to the sixth embodiment are given.

(Lens data)

| | | | |
|---|---|---|---|
| $r_1 = 41.6852$ | $d_1 = 1.00$ | $nd_1 = 1.92286$ | $υd_1 = 18.90$ |
| $r_2 = 34.9384$ | $d_2 = 2.40$ | $nd_2 = 1.49700$ | $υd_2 = 81.61$ |
| $r_3 = -48.9544$ | $d_3 = D(3)$ (variable) | | |
| $r_4 = -31.3760$ | $d_4 = 0.60$ | $nd_3 = 1.48749$ | $υd_3 = 70.44$ |
| $r_5 = 25.8081$ | $d_5 = 1.45$ | | |
| $r_6 = -15.6338$ | $d_6 = 0.60$ | $nd_4 = 1.80440$ | $υd_4 = 39.59$ |
| $r_7 = 36.8536$ | $d_7 = 0.15$ | | |
| $r_8 = 43.1433$ | $d_8 = 1.70$ | $nd_5 = 1.95906$ | $υd_5 = 17.47$ |
| $r_9 = -69.3806$ | $d_9 = D(9)$ (variable) | | |
| $r_{10} = \infty$ (aperture stop) | $d_{10} = D(10)$ (variable) | | |
| $r_{11} = 10.0000$ (aspheric surface) | $d_{11} = 4.05$ | $nd_6 = 1.49710$ | $υd_6 = 81.56$ |
| $r_{12} = -13.8828$ (aspheric surface) | $d_{12} = 0.10$ | | |
| $r_{13} = 6.7671$ | $d_{13} = 4.05$ | $nd_7 = 1.49700$ | $υd_7 = 81.61$ |
| $r_{14} = -35.9056$ | $d_{14} = 0.60$ | $nd_8 = 1.74077$ | $υd_8 = 27.76$ |
| $r_{15} = 5.1415$ | $d_{15} = 2.65$ | | |
| $r_{16} = -47.3333$ | $d_{16} = 1.80$ | $nd_9 = 1.95906$ | $υd_9 = 17.47$ |
| $r_{17} = -16.0963$ | $d_{17} = D(17)$ (variable) | | |
| $r_{18} = \infty$ | $d_{18} = 1.20$ | $nd_{10} = 1.51633$ | $υd_{10} = 64.14$ |
| $r_{19} = \infty$ | $d_{19} = D(19)$ | | |
| $r_{20} = \infty$ (image plane) | | | |

Constants of the cone (κ) and aspheric coefficients (A, B, C, D)

(eleventh plane)

K = 1.0000,
A = $-1.76863 \times 10^{-4}$, B = $2.16656 \times 10^{-6}$,
C = $-4.07744 \times 10^{-8}$, D = $-9.05479 \times 10^{-11}$ (twelfth plane)

K = 1.0000,
A = $1.61249 \times 10^{-4}$, B = $1.33028 \times 10^{-6}$,
C = $-1.17838 \times 10^{-8}$, D = $-4.06142 \times 10^{-10}$ (Zoom data)

| | Wide angle edge | Telephoto edge |
|---|---|---|
| f (focal length of entire optical system) | 9.22 | 21.24 |
| F number | 1.64 | 2.29 |
| 2ω (angle of view) | 38.19 | 15.61 |
| D(3) | 1.2517 | 11.0578 |
| D(9) | 12.6519 | 2.8459 |
| D(10) | 4.4800 | 1.3000 |
| D(17) | 4.6513 | 7.8312 |
| D(19) | 1.3706 | 1.3635 | fw(focal length of entire optical system, at wide angle edge) = 9.22
ft(focal length of entire optical system, at telephoto edge) = 21.24
Ft(F number of entire optical system, at telephoto edge) = 2.29
f1(first lens group $G_{61}$ focal length of) = 50.10
f2(second lens group $G_{62}$ focal length of) = −13.93
f3(third lens group $G_{63}$ focal length of) = 11.91
SI(distance from aperture stop STOP to image plane IMG) = 25.00
D(distance from apex of surface on object side of negative lens $L_{611}$ to image plane IMG) = 46.40
2ωt(angle of view of entire optical system, at telephoto edge) = 15.61
υ11(Abbe number for d-line of negative lens $L_{611}$) = 18.90
υ12(Abbe number for d-line of positive lens $L_{612}$) = 81.61
υ3F(Abbe number for d-line of positive lens $L_{631}$) = 81.56
υ3B(Abbe number for d-line of positive lens $L_{634}$) = 17.47
Nd3F(refractive index for d-line of positive lens $L_{631}$) = 1.50
Nd3B(refractive index for d-line of positive lens $L_{634}$) = 1.96
(Values related to conditional expression (1))
fw/f3 = 0.77
(Values related to conditional expression (2))
f3/f2 = −0.85
(Values related to conditional expression (3))
υ3F − υ3B = 64.09
(Values related to conditional expression (4))
Nd3B − Nd3F = 0.46
(Values related to conditional expression (5))
SI × Ft/2ωt = 3.68
(Values related to conditional expression (6))
ft/f1 = 0.42
(Values related to conditional expression (7))
|υ12 − υ11| = 62.71
(Values related to conditional expression (8))
D/ft = 2.18
(Values related to conditional expression (9))
f3/ft = 0.56

FIG. 12 is a diagram of various types of aberration occurring in the zoom lens according to the sixth embodiment. In the diagram, g indicates the wavelength aberration corresponding to g-line (λ=435.83 nm), d indicates the wavelength aberration corresponding to d-line (λ=587.56 nm), and C indicates the wavelength aberration corresponding to C-line (λ=656.27 nm). S and M shown with respect to astigmatism, respectively indicate aberration at the sagittal image plane and at the meridonal image plane.

Figure 13:
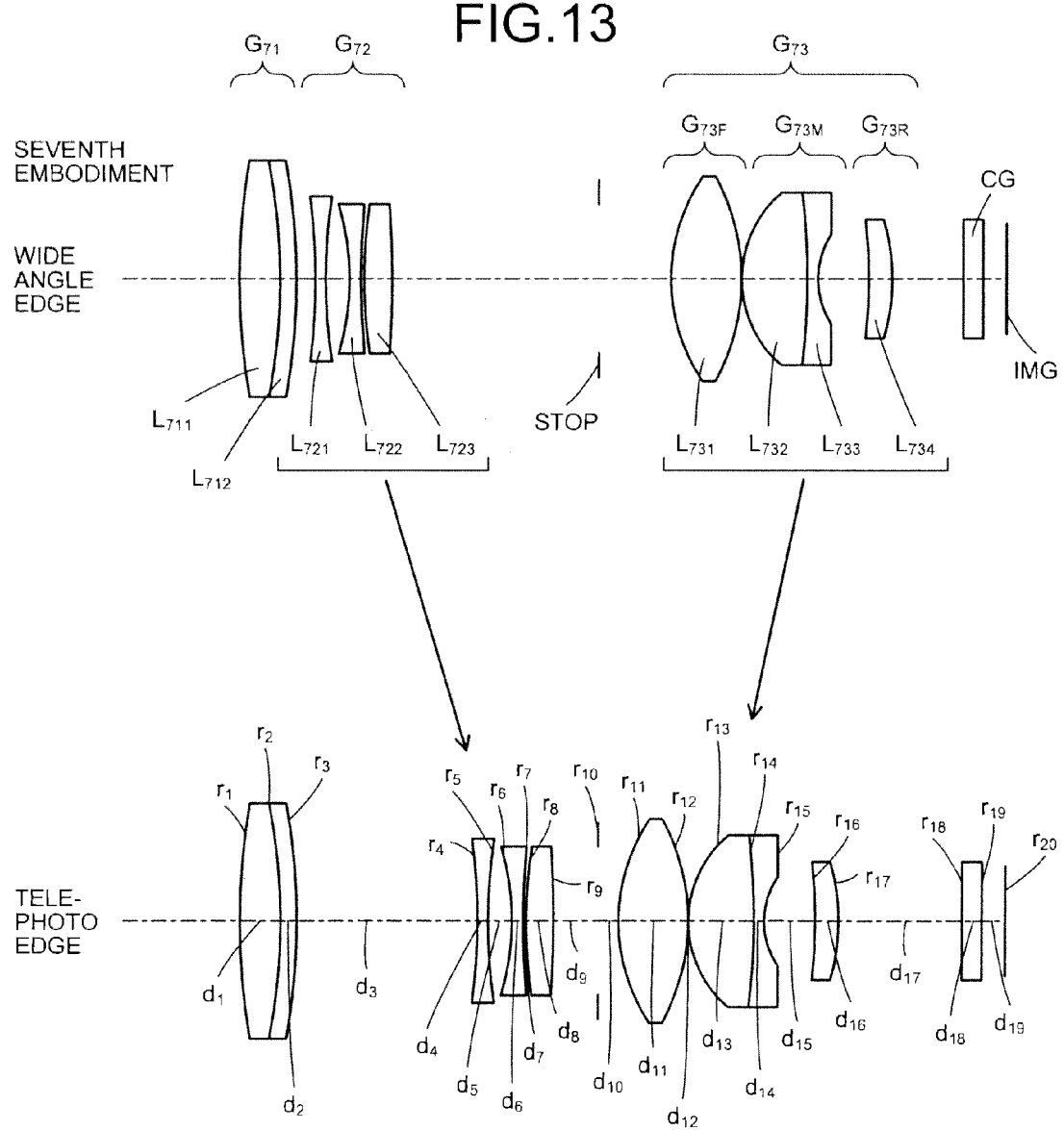
FIG. 13 is a cross sectional view (along the optical axis) of the zoom lens according to a seventh embodiment.

FIG. 13 is a cross sectional view (along the optical axis) of the zoom lens according to a seventh embodiment. The zoom lens includes sequentially from a non-depicted object (object side), a first lens group $G_{71}$ having a positive refractive power, a second lens group $G_{72}$ having a negative refractive power, the aperture stop STOP prescribing a given aperture, and a third lens group $G_{73}$ having a positive refractive power. Between the third lens group $G_{73}$ and the image plane IMG, the cover glass CG is disposed. The cover glass CG is disposed as necessary and may be omitted accordingly. At the image plane IMG, the light receiving surface of a solid state image sensor, such as a CCD and CMOS, is disposed.

The first lens group $G_{71}$ includes sequentially from the object side, a positive lens $L_{711}$ and a negative lens $L_{712}$. The positive lens $L_{711}$ and the negative lens $L_{712}$ are cemented.

The second lens group $G_{72}$ includes sequentially from the object side, a negative lens $L_{721}$, a negative lens $L_{722}$, and a positive lens $L_{723}$.

The third lens group $G_{73}$ includes sequentially from the object side, a front group $G_{73F}$ having a positive refractive power, a middle group $G_{73M}$ having a negative refractive power, and a rear group $G_{73R}$ having a positive refractive power. The front group $G_{73F}$ is formed by a positive lens $L_{731}$. Both surfaces of the positive lens $L_{731}$ are aspheric. The middle group $G_{73M}$ includes sequentially from the object side, a positive lens $L_{732}$ and a negative lens $L_{733}$. The positive lens $L_{732}$ and the negative lens $L_{733}$ are cemented. The rear group $G_{73R}$ is formed by a positive lens $L_{734}$.

In the zoom lens, the third lens group $G_{73}$ is moved along the optical axis from the image plane IMG side toward the object side to zoom from the wide angle edge to the telephoto edge. The second lens group $G_{72}$ is moved along the optical axis from the object side toward the image plane IMG side to zoom and correct variation of the image plane position.

Here, various values related to the zoom lens according to the seventh embodiment are given.

(Lens data)

| | | | |
|---|---|---|---|
| $r_1$ = 45.8255 | $d_1$ = 2.44 | $nd_1$ = 1.49700 | $\nu d_1$ = 81.61 |
| $r_2$ = −37.5084 | $d_2$ = 1.00 | $nd_2$ = 1.92286 | $\nu d_2$ = 18.90 |
| $r_3$ = −43.1291 | $d_3$ = D(3) (variable) | | |
| $r_4$ = −34.4415 | $d_4$ = 0.60 | $nd_3$ = 1.48749 | $\nu d_3$ = 70.44 |
| $r_5$ = 24.2868 | $d_5$ = 1.50 | | |
| $r_6$ = −15.0553 | $d_6$ = 0.60 | $nd_4$ = 1.80610 | $\nu d_4$ = 33.27 |
| $r_7$ = 27.1099 | $d_7$ = 0.16 | | |
| $r_8$ = 30.9324 | $d_8$ = 1.79 | $nd_5$ = 1.95906 | $\nu d_5$ = 17.47 |
| $r_9$ = −69.9137 | $d_9$ = D(9) (variable) | | |
| $r_{10}$ = ∞ (aperture stop) | $d_{10}$ = D(10) (variable) | | |
| $r_{11}$ = 10.0000 (aspheric surface) | $d_{11}$ = 4.20 | $nd_6$ = 1.49710 | $\nu d_6$ = 81.56 |
| $r_{12}$ = −13.0693 (aspheric surface) | $d_{12}$ = 0.10 | | |
| $r_{13}$ = 6.7740 | $d_{13}$ = 3.95 | $nd_7$ = 1.49700 | $\nu d_7$ = 81.61 |
| $r_{14}$ = −43.7148 | $d_{14}$ = 0.60 | $nd_8$ = 1.72825 | $\nu d_8$ = 28.32 |
| $r_{15}$ = 4.9994 | $d_{15}$ = 3.14 | | |
| $r_{16}$ = −33.5620 | $d_{16}$ = 1.40 | $nd_9$ = 1.95906 | $\nu d_9$ = 17.47 |
| $r_{17}$ = −14.8863 | $d_{17}$ = D(17) (variable) | | |
| $r_{18}$ = ∞ | $d_{18}$ = 1.20 | $nd_{10}$ = 1.51633 | $\nu d_{10}$ = 64.14 |
| $r_{19}$ = ∞ | $d_{19}$ = D(19) | | |
| $r_{20}$ = ∞ (image plane) | | | |

-continued

Constants of the cone (κ) and aspheric coefficients (A, B, C, D)

(eleventh plane)

K = 1.0000,
A = −1.99962 × $10^{-4}$, B = −4.50263 × $10^{-7}$,
C = 4.52649 × $10^{-8}$, D = −3.18138 × $10^{-9}$ (twelfth plane)

K = 1.0000,
A = 1.45926 × $10^{-4}$, B = 4.74004 × $10^{-7}$,
C = −2.93705 × $10^{-8}$, D = −1.51343 × $10^{-9}$ (Zoom data)

| | Wide angle edge | Telephoto edge |
|---|---|---|
| f (focal length of entire optical system) | 9.17 | 21.24 |
| F number | 1.64 | 2.28 |
| 2ω (angle of view) | 42.66 | 17.12 |
| D(3) | 1.2517 | 11.0578 |
| D(9) | 12.6519 | 2.8459 |
| D(10) | 4.4327 | 1.3000 |
| D(17) | 4.4838 | 7.6165 |
| D(19) | 1.2647 | 1.2653 | fw(focal length of entire optical system, at wide angle edge) = 9.17
ft(focal length of entire optical system, at telephoto edge) = 21.24
Ft(F number of entire optical system, at telephoto edge) = 2.28
f1(first lens group $G_{71}$ focal length of) = 48.27
f2(second lens group $G_{72}$ focal length of) = −13.76
f3(third lens group $G_{73}$ focal length of) = 11.95
SI(distance from aperture stop STOP to image plane IMG) = 24.81
D(distance from apex of surface on object side of positive lens $L_{711}$ to image plane IMG) = 46.40
2ωt(angle of view of entire optical system, at telephoto edge) = 17.12
ν11(Abbe number for d-line of positive lens $L_{711}$) = 81.61
ν12(Abbe number for d-line of negative lens $L_{712}$) = 18.90
ν3F(Abbe number for d-line of positive lens $L_{731}$) = 81.56
ν3B(Abbe number for d-line of positive lens $L_{734}$) = 17.47
Nd3F(refractive index for d-line of positive lens $L_{731}$) = 1.50
Nd3B(refractive index for d-line of positive lens $L_{734}$) = 1.96
(Values related to conditional expression (1))
fw/f3 = 0.77
(Values related to conditional expression (2))
f3/f2 = −0.87
(Values related to conditional expression (3))
ν3F − ν3B = 64.09
(Values related to conditional expression (4))
Nd3B − Nd3F = 0.46
(Values related to conditional expression (5))
SI × Ft/2ωt = 3.30
(Values related to conditional expression (6))
ft/f1 = 0.44
(Values related to conditional expression (7))
|ν12 − ν11| = 62.71
(Values related to conditional expression (8))
D/ft = 2.18
(Values related to conditional expression (9))
f3/ft = 0.56

FIG. 14 is a diagram of various types of aberration occurring in the zoom lens according to the seventh embodiment. In the diagram, g indicates the wavelength aberration corresponding to g-line (λ=435.83 nm), d indicates the wavelength aberration corresponding to d-line (λ=587.56 nm), and C indicates the wavelength aberration corresponding to C-line (λ=656.27 nm). S and M shown with respect to astigmatism, respectively indicate aberration at the sagittal image plane and at the meridonal image plane.

Figure 15:
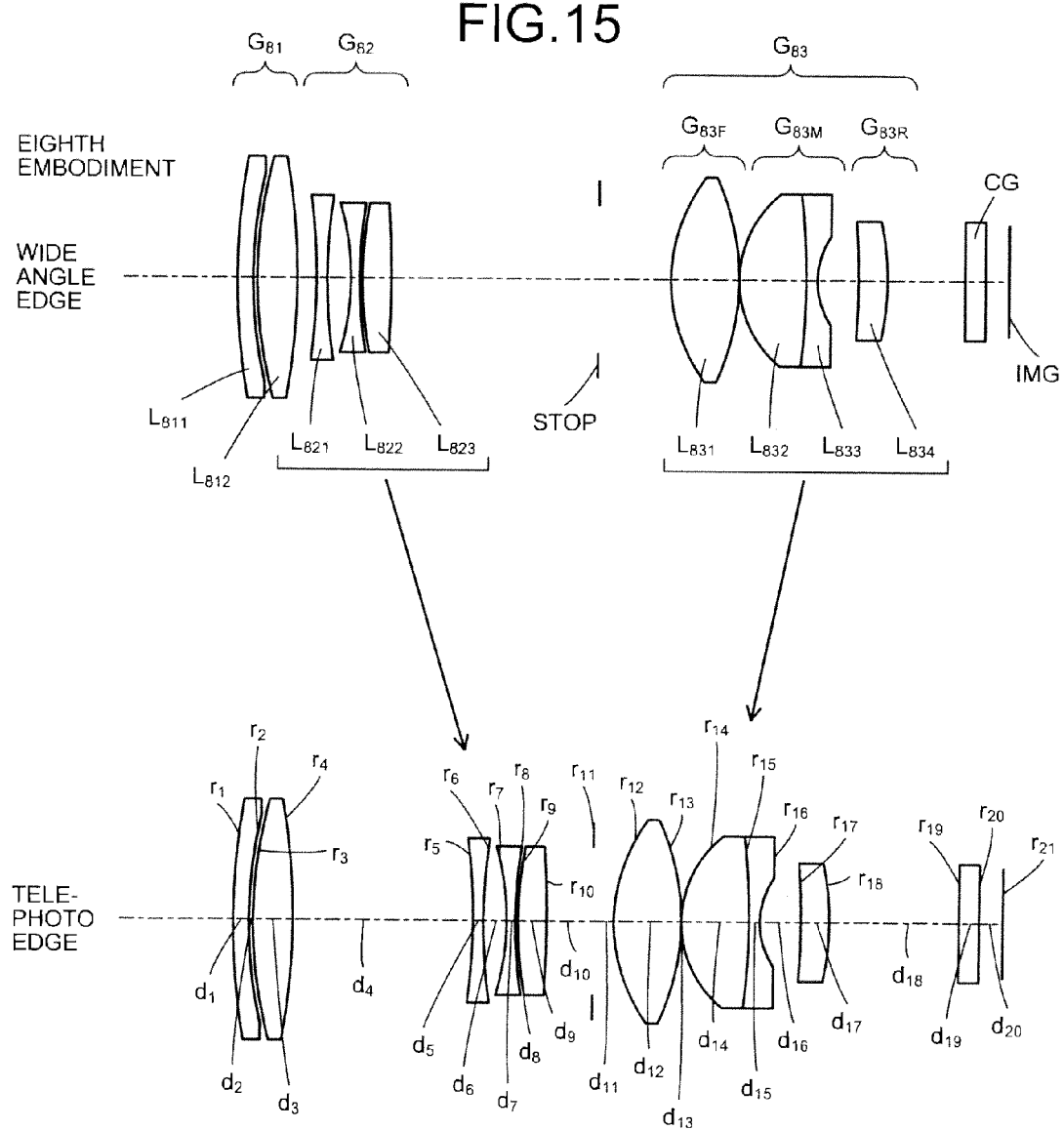
FIG. 15 is a cross sectional view (along the optical axis) of the zoom lens according to an eighth embodiment.

FIG. 15 is a cross sectional view (along the optical axis) of the zoom lens according to an eighth embodiment. The zoom lens includes sequentially from a non-depicted object (object side), a first lens group $G_n$ having a positive refractive power, a second lens group $G_{82}$ having a negative refractive power, the aperture stop STOP prescribing a given aperture, and a third lens group $G_{83}$ having a positive refractive power. Between the third lens group $G_{83}$ and the image plane IMG, the cover glass CG is disposed. The cover glass CG is disposed as necessary and may be omitted accordingly. At the image plane IMG, the light receiving surface of a solid state image sensor, such as a CCD and CMOS, is disposed.

The first lens group $G_{81}$ includes sequentially from the object side, a negative lens $L_{811}$ and a positive lens $L_{812}$.

The second lens group $G_{82}$ includes sequentially from the object side, a negative lens $L_{821}$, a negative lens $L_{822}$, and a positive lens $L_{823}$.

The third lens group $G_{83}$ includes sequentially from the object side, a front group $G_{83F}$ having a positive refractive power, a middle group $G_{83M}$ having a negative refractive power, and a rear group $G_{83R}$ having a positive refractive power. The front group $G_{83F}$ is formed by a positive lens $L_{831}$. Both surfaces of the positive lens $L_{831}$ are aspheric. The middle group $G_{83M}$ includes sequentially from the object side, a positive lens $L_{832}$ and a negative lens $L_{833}$. The positive lens $L_{832}$ and the negative lens $L_{833}$ are cemented. The rear group $G_{83R}$ is formed by a positive lens $L_{834}$.

In the zoom lens, the third lens group $G_{83}$ is moved along the optical axis from the image plane IMG side toward the object side to zoom from the wide angle edge to the telephoto edge. The second lens group $G_{82}$ is moved along the optical axis from the object side toward the image plane IMG side to zoom and correct variation of the image plane position.

Here, various values related to the zoom lens according to the eighth embodiment are given.

(Lens data)

| | | | |
|---|---|---|---|
| $r_1 = 41.5895$ | $d_1 = 1.00$ | $nd_1 = 1.92286$ | $vd_1 = 18.90$ |
| $r_2 = 34.9900$ | $d_2 = 0.10$ | | |
| $r_3 = 34.9617$ | $d_3 = 2.40$ | $nd_2 = 1.497$ | $vd_2 = 81.61$ |
| $r_4 = -49.0236$ | $d_4 = D(4)$ (variable) | | |
| $r_5 = -31.5013$ | $d_5 = 0.60$ | $nd_3 = 1.48749$ | $vd_3 = 70.44$ |
| $r_6 = 25.7445$ | $d_6 = 1.45$ | | |
| $r_7 = -15.6092$ | $d_7 = 0.60$ | $nd_4 = 1.8044$ | $vd_4 = 39.59$ |
| $r_8 = 37.1532$ | $d_8 = 0.15$ | | |
| $r_9 = 43.5974$ | $d_9 = 1.68$ | $nd_5 = 1.95906$ | $vd_5 = 17.47$ |
| $r_{10} = -69.1402$ | $d_{10} = D(10)$ (variable) | | |
| $r_{11} = \infty$ (aperture stop) | $d_{11} = D(11)$ (variable) | | |
| $r_{12} = 10.0000$ (aspheric surface) | $d_{12} = 4.02$ | $nd_6 = 1.4971$ | $vd_6 = 81.56$ |
| $r_{13} = -13.8359$ (aspheric surface) | $d_{13} = 0.10$ | | |
| $r_{14} = 6.7400$ | $d_{14} = 4.05$ | $nd_7 = 1.497$ | $vd_7 = 81.61$ |
| $r_{15} = -37.8748$ | $d_{15} = 0.60$ | $nd_8 = 1.74077$ | $vd_8 = 27.76$ |
| $r_{16} = 5.1025$ | $d_{16} = 2.72$ | | |
| $r_{17} = -52.8147$ | $d_{17} = 1.80$ | $nd_9 = 1.95906$ | $vd_9 = 17.47$ |
| $r_{18} = -16.6498$ | $d_{18} = D(18)$ (variable) | | |
| $r_{19} = \infty$ | $d_{19} = 1.20$ | $nd_{10} = 1.51633$ | $vd_{10} = 64.14$ |
| $r_{20} = \infty$ | $d_{20} = D(20)$ | | |
| $r_{21} = \infty$ (image plane) | | | |

Constants of the cone ($\kappa$) and aspheric coefficients (A, B, C, D)

(twelfth plane)

$K = 1.0000$,
$A = -1.78873 \times 10^{-4}$, $B = 2.04221 \times 10^{-6}$,
$C = -4.20470 \times 10^{-8}$, $D = -2.08204 \times 10^{-11}$ (thirteenth plane)

$K = 1.0000$,
$A = 1.59641 \times 10^{-4}$, $B = 1.20964 \times 10^{-6}$,
$C = -1.34776 \times 10^{-8}$, $D = -3.03134 \times 10^{-10}$ (Zoom data)

| | Wide angle edge | Telephoto edge |
|---|---|---|
| f (focal length of entire optical system) | 9.22 | 21.24 |
| F number | 1.64 | 2.29 |
| 2ω (angle of view) | 42.44 | 17.13 |
| D(4) | 1.2517 | 11.0578 |
| D(10) | 12.6519 | 2.8459 |
| D(11) | 4.4609 | 1.3000 |
| D(18) | 4.6562 | 7.8171 |
| D(20) | 1.2536 | 1.2463 | fw(focal length of entire optical system, at wide angle edge) = 9.22
ft(focal length of entire optical system, at telephoto edge) = 21.24
Ft(F number of entire optical system, at telephoto edge) = 2.29
f1(first lens group $G_{81}$ focal length of) = 49.91
f2(second lens group $G_{82}$ focal length of) = -13.91
f3(third lens group $G_{83}$ focal length of) = 11.89
SI(distance from aperture stop STOP to image plane IMG) = 24.92
D(distance from apex of surface on object side of negative lens $L_{811}$ to image plane IMG) = 46.40
2ωt(angle of view of entire optical system, at telephoto edge) = 17.13
υ11(Abbe number for d-line of negative lens $L_{811}$) = 18.90
υ12(Abbe number for d-line of positive lens $L_{812}$) = 81.61
υ3F(Abbe number for d-line of positive lens $L_{831}$) = 81.56
υ3B(Abbe number for d-line of positive lens $L_{834}$) = 17.47
Nd3F(refractive index for d-line of positive lens $L_{831}$) = 1.50
Nd3B(refractive index for d-line of positive lens $L_{834}$) = 1.96
(Values related to conditional expression (1))
fw/f3 = 0.78
(Values related to conditional expression (2))
f3/f2 = -0.85
(Values related to conditional expression (3))
υ3F − υ3B = 64.09
(Values related to conditional expression (4))
Nd3B − Nd3F = 0.46
(Values related to conditional expression (5))
SI × Ft/2ωt = 3.33
(Values related to conditional expression (6))
ft/f1 = 0.43
(Values related to conditional expression (7))
|υ12 − υ11| = 62.71
(Values related to conditional expression (8))
D/ft = 2.18
(Values related to conditional expression (9))
f3/ft = 0.56

FIG. 16 is a diagram of various types of aberration occurring in the zoom lens according to the eighth embodiment. In the diagram, g indicates the wavelength aberration corresponding to g-line (λ=435.83 nm), d indicates the wavelength aberration corresponding to d-line (λ=587.56 nm), and C indicates the wavelength aberration corresponding to C-line (λ=656.27 nm). S and M shown with respect to astigmatism, respectively indicate aberration at the sagittal image plane and at the meridonal image plane.

Among the values for each of the embodiments, r1, r2, . . . indicate radii of curvature for each lens, aperture stop surface, etc.; d1, d2, . . . indicate the thickness of the lenses, aperture stop, etc. or the distance between surfaces thereof; nd1, nd2, . . . indicate the refraction index of each lens with respect to the d-line (λ=587.56 nm); and vd1, vd2, . . . indicate the Abbe number with respect to the d-line (λ=587.56 nm) of each lens. Lengths are indicated in units of [mm] and angles are indicated in [degrees].

Each aspheric surface shape above is expressed by equation [1], where H is the height from the optical axis, X(H) is the displacement in a direction parallel to the optical axis at the height H when the apex of the lens surface is regarded as the origin, R is paraxial radius of curvature; K is the constant of the cone; A, B, C, and D are the fourth, sixth, eighth, and tenth order aspheric coefficients, respectively, and the travel direction of light is positive.

$$X(H) = \frac{H^2/R}{1 + \sqrt{1 - (KH^2/R^2)}} + AH^4 + BH^6 + CH^8 + DH^{10} \quad (1)$$

As described, the zoom lens of each of the embodiments realizes favorable aberration correction of light of a wide spectrum of wavelengths, ranging from visible light to near infrared, and obtains a bright, good quality image. In particular, by satisfying each of the conditional expressions described, various types of aberration caused by deterioration of imaging performance with respect to light of a wide spectrum of wavelengths can be favorably corrected while maintaining a compact size. In addition, a high zoom ratio is possible. Further, aspheric lenses and cemented lenses are suitably arranged, whereby good imaging performance and a more compact size can be achieved.

As described the zoom lens according to the present invention is useful in imaging apparatuses equipped with solid state image sensors and is particularly suitable for surveillance cameras used at night.

The invention enables longitudinal chromatic aberration, field curvature, and spherical aberration of light of a wide spectrum of wavelengths, ranging from visible light to near infrared light, to be favorably corrected.

The invention enables a bright F number and a high zoom ratio with sacrifice of compactness of the optical system.

The invention enables various types of aberration occurring throughout the zoom range to be favorably corrected. In particular, spherical aberration and longitudinal chromatic aberration can be favorably corrected.

The invention enables improved imaging performance with sacrifice of compactness of the optical system.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2011-232252 filed in Japan on Oct. 21, 2011.

What is claimed is:

1. A zoom lens comprising sequentially from an object side, a first lens group having a positive refractive power, a second lens group having a negative refractive power, an aperture stop, and a third lens group having a positive refractive power, the third lens group being moved along an optical axis from an image side toward the object side to zoom from a wide angle edge to a telephoto edge and the second lens group being moved along the optical axis from the object side toward the image side to zoom and correct variation of an image plane position, wherein the first lens group includes a negative lens and a positive lens, the second lens group includes sequentially from the object side, two negative lenses and one positive lens, the third lens group includes sequentially from the object side, a front group that has a positive overall refractive power and includes a positive aspheric lens, a middle group that has a negative overall refractive power and includes one cemented lens formed by a positive lens and a negative lens, and a rear group having a positive refractive power, and the zoom lens satisfies a conditional expression (1) $0.7 \leq fw/f3 \leq 1.0$ and a conditional expression (2) $-1.0 f3/f2 \leq -0.5$, where fw represents a focal length of the entire optical system, at the wide angle edge; f2 represents a focal length of the second lens group; and f3 represents a focal length of the third lens group.

2. The zoom lens according to claim 1, wherein the zoom lens satisfies conditional expression (3) $45 \leq v3F - v3B \leq 70$ and conditional expression (4) $0.4 \leq Nd3B - Nd3F \leq 0.7$, where v3F represents an Abbe number for d-line of a lens that among the third lens group is disposed farthest on the object side, v3B represents an Abbe number for d-line of a lens that among the third lens group is disposed farthest on the image side, Nd3F represents a refractive index for d-line of the lens that among the third lens group is disposed farthest on the object side, and Nd3B represents a refractive index for d-line of the lens that among the third lens group is disposed farthest on the image side.

3. The zoom lens according to claim 1, wherein the zoom lens satisfies a conditional expression (5) $2.0 \leq SI \times Ft/2\omega t \leq 4.5$, where SI represents a distance from the aperture stop to an image plane; Ft represents an F number of the entire optical system, at the telephoto edge; and $2\omega t$ represents an angle of view of the entire optical system, at the telephoto edge.

4. The zoom lens according to claim 1, wherein the zoom lens satisfies a conditional expression (6) $0.3 \leq ft/f1 \leq 0.6$, where ft represents a focal length of the entire optical system, at the telephoto edge and f1 represents a focal length of the first lens group.

5. The zoom lens according to claim 1, wherein the zoom lens satisfies a condition expression (7) $50 \leq |v12 - v11| \leq 60$, a conditional expression (8) $2.0 \leq D/ft \leq 2.3$, and a conditional expression (9) $0.3 \leq f3/ft \leq 0.6$, where v11 represents an Abbe number for d-line of a lens that among the first lens group is disposed farthest on the object side, v12 represents an Abbe number for d-line of a lens that among the first lens group is disposed second farthest on the image side, D represents a distance from an apex of a surface on the object side of the lens that among the first lens group is disposed farthest on the object side to an image plane, f3 represents a focal length of the third lens group, and ft represents a focal length of the entire optical system, at the telephoto edge.

* * * * *